United States Patent [19]
Lengyel et al.

[11] Patent Number: 6,016,150
[45] Date of Patent: Jan. 18, 2000

[54] SPRITE COMPOSITOR AND METHOD FOR PERFORMING LIGHTING AND SHADING OPERATIONS USING A COMPOSITOR TO COMBINE FACTORED IMAGE LAYERS

[75] Inventors: Jerome E. Lengyel, Seattle; John Snyder, Redmond, both of Wash.

[73] Assignee: Microsoft Corporation, Redmond, Wash.

[21] Appl. No.: 08/904,486

[22] Filed: Jul. 30, 1997

Related U.S. Application Data

[63] Continuation-in-part of application No. 08/671,412, Jun. 27, 1996, Pat. No. 5,867,166, which is a continuation-in-part of application No. 08/560,114, Nov. 17, 1995, abandoned, which is a continuation of application No. 08/511,553, Aug. 4, 1995, abandoned.

[51] Int. Cl.$^7$ ............................................. G06F 15/00
[52] U.S. Cl. ...................... 345/426; 345/507; 345/430; 345/431
[58] Field of Search ................................ 345/435, 426, 345/113, 114, 418, 419, 422, 431, 430, 433, 421, 424, 425, 428, 507, 432, 429, 423

[56] References Cited

U.S. PATENT DOCUMENTS

| | | | |
|---|---|---|---|
| 5,384,912 | 1/1995 | Ogrine et al. ............................ | 345/523 |
| 5,673,401 | 9/1997 | Volk et al. ............................... | 345/327 |
| 5,684,935 | 11/1997 | Demesa, III et al. . | |
| 5,706,417 | 1/1998 | Adelson .................................. | 345/429 |
| 5,867,166 | 2/1999 | Myhrvold et al. ...................... | 345/419 |

OTHER PUBLICATIONS

Cook, R. L., "Shade Trees," *Computer Graphics*, 18:3, 223–231 (Jul 1984).
Dorsey et al., "Interactive Design of Complex Time–Dependent Lighting," *IEEE Computer Graphics and Applications*, 26–36 (Mar. 1995).
Guenter, et al., "Specializing Shaders," *Computer Graphics Proceedings*, Annual Conference Series, 343–350 (1995).
Hanrahan et al., "A Language for Shading and Lighting Calculations," *Computer Graphics*, 24:4, 289–298 (Aug. 1990).
Meier, B.J., "Painterly Rendering for Animation," *Computer Graphics Proceedings*, Annual Conference Series, 477–484 (1996).
Porter, et al., "Compositing Digital Images," *Computer Graphics*, 18:3, 253–259 (Jul. 1984).
Segal, et al., "Fast Shadows and Lighting Effects Using Texture Mapping," *Computer Graphics*, 26:2, 249–252 (Jul. 1992).
Regan, Matthew and Ronald Pose, "Priority Rendering With a Virtual Reality Address Recalculation Pipeline", ACM SIGGRAPH '94, *Computer Graphics Proceedings, Annual Conference Series*, pp. 155–162, 1994.
Regan, Matthew and Ronald Pose, "Low Latency Virtual Reality Display System", *Technical Report No. 92/166, Monash University, Victoria, Australia*, pp. 1–1, Sep., 1992.
Regan, Matthew and Ronald Pose, "A Interactive Graphics Display Architecture", *IEEE Virtual Reality*, 1993 International Symposium, pp. 293–299, 1993.

*Primary Examiner*—Mark K. Zimmerman
*Assistant Examiner*—Chante' E. Harrison
*Attorney, Agent, or Firm*—Klarquist Sparkman Campbell Leigh & Whinston LLP

[57] ABSTRACT

A layered graphics rendering pipeline for real time 3D animation independently renders terms in a shading model to separate image layers. The layered pipeline factors the shading model into separate image layers and renders geometry to these layers independently. Each layer can have an independent update rate and a spatial resolution different than the resolution of the output images. A compositor that supports one or more image operators composites the factored layers into an output image to generate frames of animation. To reduce rendering overhead, factored terms can be rendered once and then re-used in later frames by warping the initial rendering.

31 Claims, 10 Drawing Sheets

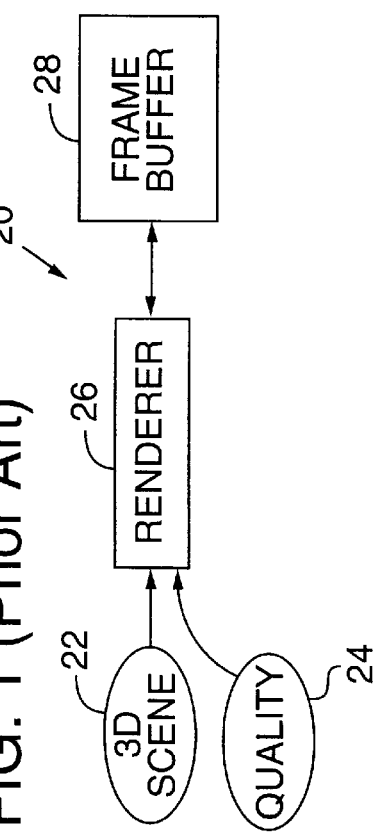
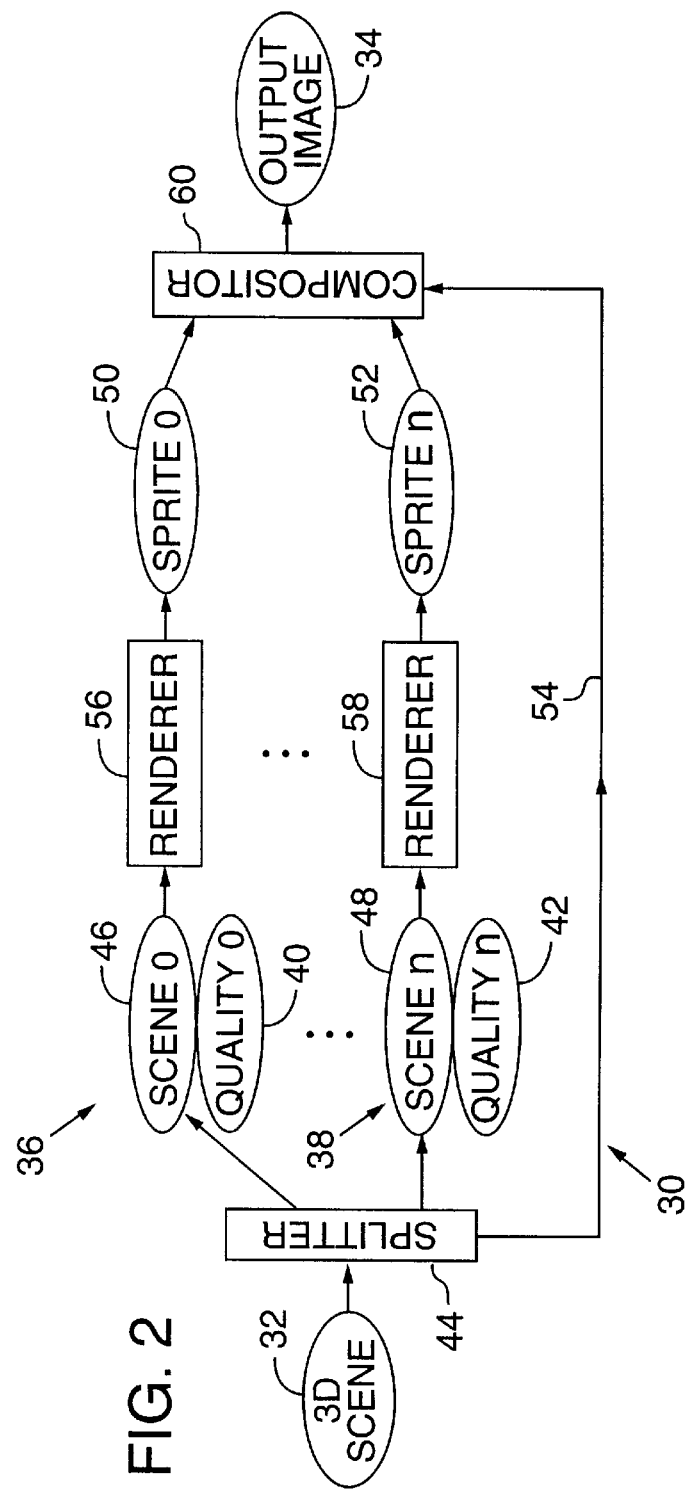
FIG. 1 (Prior Art)
FIG. 2

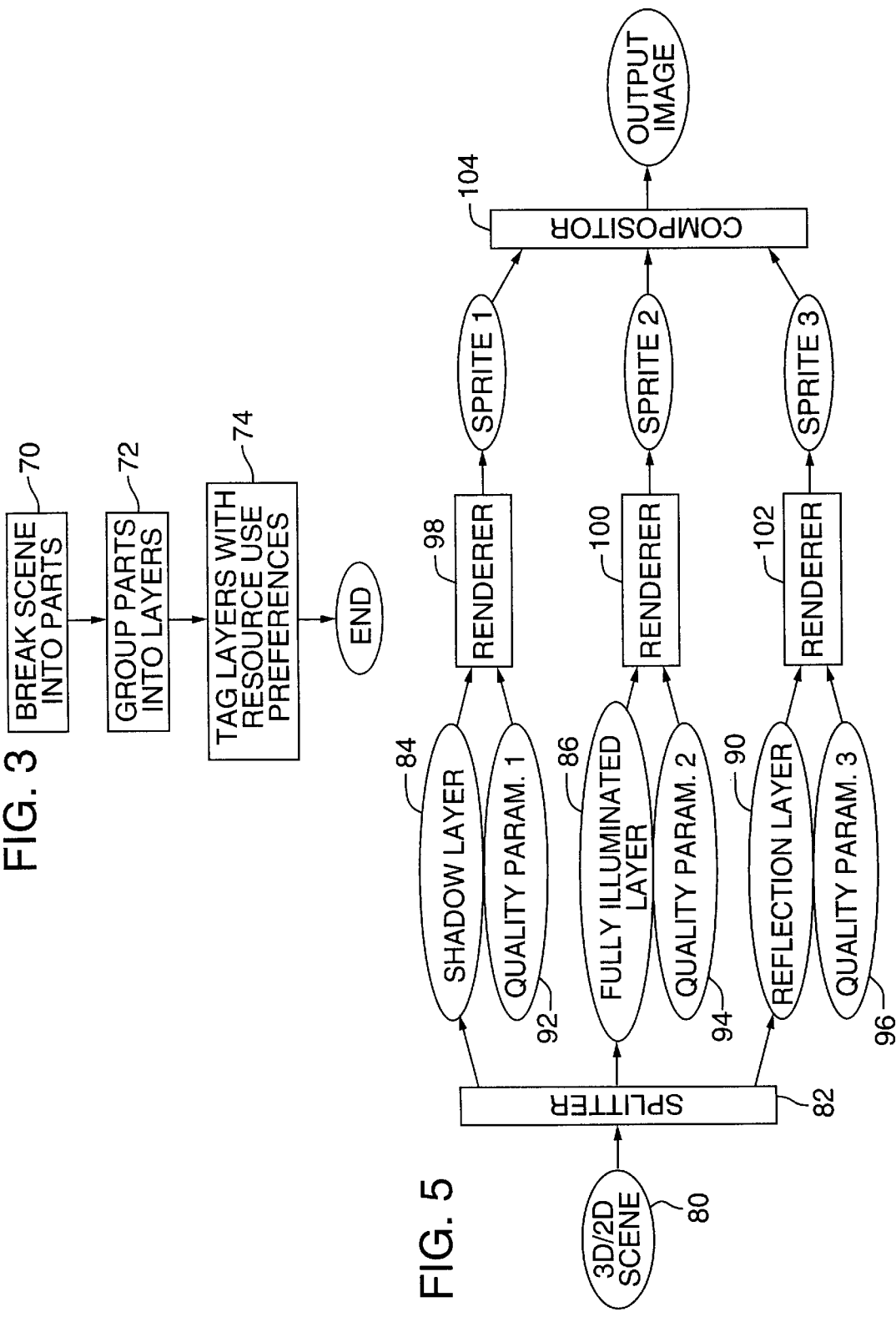

3D SHAPE      SCREEN COORDINATES

SPRITE COMPOSITOR AND METHOD FOR PERFORMING LIGHTING AND SHADING OPERATIONS USING A COMPOSITOR TO COMBINE FACTORED IMAGE LAYERS

RELATED APPLICATION DATA

The present application is a continuation-in-part of U.S. application Ser. No. 08/671,412, filed Jun. 27, 1996 (now issued as U.S. Pat. No. 5,867,166), which is a continuation-in-part of application Ser. No. 08/560,114 filed Nov. 17, 1995 (now abandoned). application Ser. No. 08/560,114 is a continuation of application Ser. No. 08/511,553 filed Aug. 4, 1995 (now abandoned).

FIELD OF THE INVENTION

The invention generally relates to real time graphics rendering systems, and more specifically relates to lighting and shading operations used to enhance visual realism in 3D animation.

BACKGROUND OF THE INVENTION

Lighting and shading operations are used in graphics rendering to enhance visual realism of computer-generated animation. Three-dimensional (3D) graphics rendering is the process of converting 3D models in a scene to a two-dimensional (2D) image consisting of an array of picture elements or "pixels." In real time 3D graphics, the position of the 3D models and the viewing perspective of the scene (the camera or viewpoint) vary with time, and the rendering system has to repeatedly sample the models and compute new output images to animate the objects depicted in the display image. Performed during the rendering process, lighting and shading operations enhance realism by modeling real world visual effects such as shadows, surface shading, and illumination from different types of light sources. Unfortunately, sophisticated shading operations consume additional rendering resources and are difficult to implement in real time graphics systems where new output images need to be generated repeatedly in only fractions of a second.

Conventional 3D rendering systems perform lighting and shading based on a shading model, specified by the author of the animation. In this context, the term "shading model" generally encompasses a variety of expressions used to represent visual effects such as lighting (sometimes referred to as illumination), shading, shadows, reflections, and texture maps. The shading model tells the rendering system how to modify pixel values, and more specifically, the color values at pixel locations throughout an image to achieve realistic visual effects such as lighting from multiple light sources, surface shading, and shadows.

While shading models can enhance realism, they can also consume a significant amount of processing resources, especially when evaluated across the entire scene for each new output image in an animation sequence. The computational burden is easier to understand in terms of a specific example. The surfaces of the 3D objects in a scene are typically modeled using a mesh of surface elements called polygons. A typical scene can easily include over ten thousand polygons. The rendering system transforms these polygons to a view space, removes hidden surfaces, and converts polygons into pixel values to compute an output image. For some lighting and shading operations, the rendering system has to make more than one rendering pass through all of the polygons in the entire scene. Now consider a display device with a refresh rate of 60 Hz and a spatial resolution of 1024×1024 pixels. While the rate at which the rendering system computes a new output image or "frame" does not have to be the same as the refresh rate of the display device, it should be around 60 Hz to produce high quality results. In this example, the rendering system has to process over ten thousand polygons, possibly multiple times, to compute pixel values at over million pixel locations in $\frac{1}{60}$ of a second.

As is apparent from this example, it is difficult to perform sophisticated lighting and shading operations within the constraints of a real time system. In view of the rate with which new images need to be computed, rendering resources are severely limited. High-end graphics workstations have the computing power and bandwidth to re-render the entire scene at the same rate and resolution. However, these workstations are quite expensive and still have limitations in the extent to which they can make multiple rendering passes. One significant problem with conventional rendering architectures, even on high-end workstations, is that they render each of the objects in a scene at a fixed rate and spatial resolution. This tends to waste rendering resources because some aspects of the geometric or shading models do not need to be re-rendered at the same resolution and update rate to achieve high quality animation.

FIG. 1 is a high level diagram illustrating a conventional frame buffer architecture 20. A conventional graphics pipeline processes the entire scene database to produce each output image. The scene database (represented as the 3D scene 22) includes 3D graphical models, their attributes such as surface colors, translucency and textures, and any shading models applied to graphical models.

The quality parameters 24 of geometry level of detail and texture level of detail can be set independently for each object. However, other quality parameters 24 such as the sampling resolutions in time and space are global, with fixed values for the entire scene.

To generate each new output image, the renderer 26 process the entire scene database to compute an output image comprising an array of pixel values. As it produces pixel values, it places them in a frame buffer 28, which is a large, special purpose memory used to store pixel values for each pixel location in the output image. These pixel values can include a color triplet such as RGB or YUV color, translucency (alpha), and depth (z). The size of the pixel array in the frame buffer is consistent with the resolution of the display device. More concretely, each pixel location in the frame buffer usually corresponds to a screen coordinate of pixel on the display screen of a display device.

In frame buffer architectures, shading models can be rendered using multi-pass rendering techniques. Multi-pass rendering is a rendering technique in which the renderer 26 makes multiple passes through the scene database 22, using at least one pass to compute each term in the shading model. With each pass, the renderer computes new pixel values at the pixel locations and then combines the results with results from a previous pass, accumulated in the frame buffer 28.

Consider an example of a multi-pass rendering, in which a scene illuminated by a light source has shadows and a reflection. To compute the shadows, the scene is rendered from the perspective of the light source to create a depth map, and then rendered from the perspective of the view point to compute the extent to which each pixel is in shadow. The result of the shadowing passes is an array of shadow attenuation coefficients at pixel locations defining the extent to which each pixel's colors are attenuated due to the scene's shadowing. To compute the fully illuminated scene, the renderer renders the scene from the perspective of the view point, with the objects fully illuminated by the light source. The renderer generates the reflection by rendering the scene separately with a reflected camera or with an environment map to create a texture map. In a later pass, this texture map has to be mapped to the surface of an object or objects such as a mirror, window, or lake in the scene. With traditional architectures, the shadow attenuation coefficients, the rendering of the fully illuminated scene, and the texture map of the reflection can be combined into the frame buffer using pixel blend operations supported by the 3D hardware, as described by Mark Segal, Carl Korobkin, Rolf van Widenfelt, Jim Foran, and Paul Haeberli in Fast Shadows and Lighting Effects Using Texture Mapping, in proceedings of SIGGRAPH '92.

The problem with this form of multi-pass rendering is that it is performed using a fixed spatial resolution and update rate. Each new output image is computed using multiple rendering passes to create an image at the screen resolution. Specifically, in conventional architectures, each rendering pass computes pixels at the same spatial resolution. This is inefficient because some rendering passes do not need to be rendered at this resolution. In addition, each rendering pass is performed for each new output image. This is also inefficient because some rendering passes do not need to be updated this frequently, based on their relative importance to the quality of the output image.

Others have studied shading expressions extensively and have proposed techniques for factoring shading expressions. However, these techniques suffer from the same disadvantages as the technique of Segal et al., namely, they render scene elements at full resolution and do not use warping to reuse rendered images. Dorsey et al. factor only over the lights. See, Interactive Design of Complex Time Dependent Lighting, Julie Dorsey, Jim Arvo, Donald P. Greenberg, *IEEE Computer Graphics and Application*, March 1995, Volume 15, Number 2, pp. 26–36. Guenter et al. factor into pre-computed cached terms. See, Specializing Shaders, Brian Guenter, Todd B. Knoblock, and Erik Ruf, *SIGGRAPH* 95, pp. 343–350. Meier factors as a post-process. See, Painterly Rendering for Animation, Barbara J. Meier, *SIGGRAPH* 96, pp. 477–484.

Dorsey et al. factors shading expressions by light source and linearly combines the resulting images in the final display. Guenter et al. cache intermediate results. Meier uses image processing techniques to factor shadow and highlight regions into separate layers which are then re-rendered using painterly techniques and finally composited. None of these techniques render layers at varying spatial resolution, nor re-use rendered layers. Moreover, none of these techniques assign rendering resources based on the relative importance of a layer to the quality of the output image.

SUMMARY OF THE INVENTION

The invention comprises a method for performing lighting and shading operations in a real time graphics system by factoring a shading model into image layers and combining the image layers with an image compositor. The invention also includes a sprite compositor for combining factored layers into an output image. In the method, a layered graphics rendering pipeline factors terms in a shading model into separate layers (sprites), renders the layers independently, and uses a sprite compositor to combine the terms of the shading model.

The method begins by factoring terms in the shading model so that they can be rendered to separate image layers. The terms in the shading model can be factored into image layers, and combined with image operators, such as the Over, Add, and Multiply Operators. The image layers represent the terms in the shading model such as: 1) a shadowing term, representing a shadow modulation factor, 2) a lighting term representing an object illuminated from a light source, 3) a texture representing surface detail mapped to an object's surface, or 4) a reflection term representing the reflection of one object on the surface of another. The scene can be factored over shading model terms and individual objects, rather than globally across object sets. This enables the system to provide independent quality parameters for each layer, and specifically, each factor in the shading model.

Once the scene is factored, the next step is to render the terms of the shading model to separate image layers. The factored terms are independent and can be rendered at different spatial and temporal resolution. Maximizing perceptual quality, the layered pipeline can regulate spatial resolution and update rate of factored terms by adjusting layer parameters dynamically based on available rendering resources. The update rate of the layers can be controlled by tracking motion or color changes in the image layers and using a 2D warp or color warp to approximate these changes. In one implementation for example, the rendering pipeline measures image fidelity during the rendering process and uses this information to control update rate and spatial resolution of the image layers.

To generate an output image, an image compositor combines the rendered image layers using image operators. For example, to add lighting or reflection terms, the compositor uses the Add image operator to add samples from one layer to samples at corresponding locations in another layer. To multiply an image layer by a shadow layer, the compositor can use a Multiply image operator that multiplies each sample in an image layer by a shadow attenuation coefficient (or "modulation factor") from a corresponding location in the shadow layer. The standard Over operator can be used to combine translucent image layers, to add layers together and to approximate the Multiply image operator. The compositor has at least two buffers for storing results of compositing operations. To update the output image quickly, the compositor combines intermediate results into one buffer while scanning display pixels from another buffer.

One implementation of our method computes a tight-fitting sprite that bounds the projection of an object's shape to an image layer in the output coordinates (screen coordinates). The renderer in the graphics pipeline renders the image layer by computing sprite samples in sprite space. Before combining the sprite with other sprites, the compositor maps the sprite from its sprite coordinates to the screen coordinates. The resolution of the sprite can vary from the other sprites and the output image. In addition, the update rate of the sprite can vary from other sprites and the refresh rate of the display. This implementation varies the update rate while minimizing loss in fidelity by performing a 2D warp on a previous rendering of a sprite to approximate its position in a current frame. The spatial and temporal resolution of each sprite can be regulated based on a budget of the total number of polygons and pixel fill operations available in the system.

The approach for rendering terms in a shading model to independent layers has a number of advantages. First, it more effectively exploits coherence by separating fast changing scene elements from slower changing elements and rendering them at independent update rates. Second, it more optimally targets rendering resources to aspects of the scene that have a more noticeable impact on the fidelity of the output image. Terms in the shading model can be rendered at lower spatial resolution and then scaled to screen coordinates. In addition, terms can be rendered at independent update rates, and can be warped to approximate the term in a later frame. This approach can enhance rendering architectures that emulate the compositor and architectures that have a separate compositor. Off-loading pixel fill operations from the renderer gives additional advantages by freeing up rendering resources in the renderer. Additional features and advantages of the invention will become more apparent from the following detailed description and accompanying drawings.

BRIEF DESCRIPTION OF THE DRAWINGS

FIG. 1 is a diagram illustrating a conventional graphics rendering pipeline.

FIG. 2 is diagram illustrating a layered graphics rendering pipeline.

FIG. 3 is a diagram illustrating a method for rendering a scene to separate image layers.

FIG. 5 is a diagram of a layered pipeline for rendering terms in a shading model to separate image layers.

DETAILED DESCRIPTION

Figure 4A:
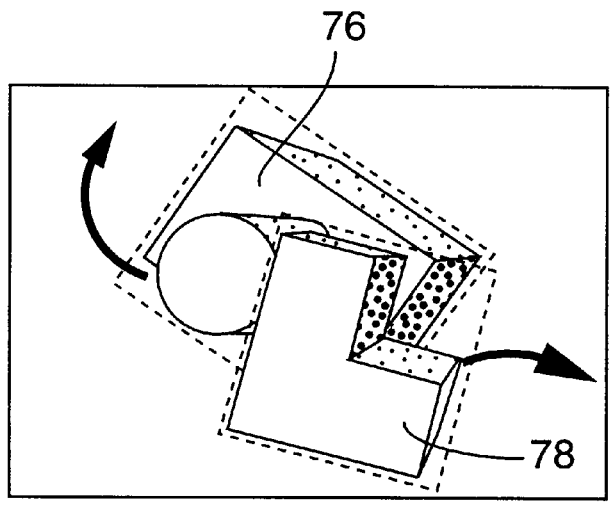
FIGS. 4A–C are examples illustrating how object geometry is assigned to image layers.

FIG. 2 is a diagram depicting a layered graphics rendering pipeline 30. Like a traditional frame buffer approach, the input to the pipeline is a 3D scene 32 describing the position and visual attributes of the graphical objects in the scene. The output 34 is a rendered digital image comprising a two-dimensional array of pixel values. Unlike the traditional frame buffer approach, the layered pipeline splits the scene into separate layers (e.g., 36 and 38), each with independent quality parameters 40–42, and can render these layers at independent spatial and temporal resolution. The spatial resolution refers to the dimensions, in pixels, of the rendered image layer, while the temporal resolution refers to the rate at which the pipeline re-renders a particular layer.

In a layered pipeline, the spatial resolution of each of the layers can differ from each other and from the resolution of the output image. For example, the pipeline can render a background or blurry object at a lower resolution, and then scale the rendering to screen coordinates for display. While the number of geometric primitives (e.g., polygons) needed to render this type of object stays the same, the renderer uses fewer pixel fill operations to render the layer.

The temporal resolution of each of the layers can also vary from one another and from the display update rate. The display update rate, sometimes called the display refresh rate, is the rate at which the display controller scans an output image to the display device. In a traditional frame buffer approach, it is possible to redraw the contents of the frame buffer at a different rate than the update rate of the display, but the entire scene is usually re-rendered to compute a new output image at the same rate. In a layered pipeline, each of the layers that make up a particular output image can be rendered at different rates and stored (e.g., cached) as separate layers. One distinction between the conventional architecture and the layered pipeline is the rate at which the elements in the scene are updated. In the conventional architecture, rendering of geometry and shading terms occurs at a fixed rate, the rate at which a new output image is generated. In a layered pipeline, independent layers representing geometry or shading terms are rendered at independent rates. The rate at which the output image is assembled can vary from the updates of the individual layers in the output image.

Depending on the design of the compositor in the layered pipeline, it is possible to compose and scan out a portion of the output image as needed. Once the system has rendered the image layers, the compositor can compose a scanline or a scanline band at a time by combining only rendered layers that impinge on the current scanline or band. Since the layers are rendered and cached independently, the rate at which a new output image is composed can be independent of the individual update rates of the layers.

As an example of layers with independent temporal resolution, consider a scene with fast moving foreground objects and static objects in the background. It is not necessary to re-render static objects, especially if the view point does not change significantly. In addition, it is not necessary to re-render terms of a lighting expression for every frame if those terms do not change significantly from frame to frame, even if other terms in the same expression have changed. Thus, static or re-usable layers can have a different update rate from layers that change substantially from frame to frame.

In FIG. 2, the input 32 to a layered pipeline includes the set of 3D objects in the scene, and the position of objects, light sources, and the viewpoint for the scene. In the context of animation, the position of objects, light sources and the viewpoint can be time-varying, in which case, the position of these scene elements are represented as functions of time. The 3D scene also includes shading or lighting models that can apply to individual objects or several objects in the scene. The scene can also include 2D elements such as texture maps. We use the term shading model to broadly encompass illumination models, lighting models and shading models. Since the layered pipeline can render layers at different rates, it can sample the position of the graphical objects and time varying terms in the shading models at different rates.

The splitter 44 shown in FIG. 2 represents the step of factoring the scene into separate layers. This stage splits the scene into scene elements 46, 48 and their associated quality parameters 40, 42. The scene elements 46, 48 represent geometry and/or terms in the shading expression that will be rendered to a separate image layer called a sprite 50, 52. The quality parameters 40, 42 represent texture level of detail and geometry level of detail, as in a conventional frame buffer architecture. In addition, they can include the temporal resolution, spatial resolution, and metrics (also called fiducials) that the graphics pipeline uses to regulate the fidelity of the image layer. For example, one metric used to regulate the temporal resolution is the position metric, which measures the difference in position of characteristic points on a warped sprite relative to the characteristic points generated from the object model in screen coordinates. This metric regulates temporal resolution because it indicates when an object can no longer be accurately represented by re-using a sprite and needs re-rendering.

The splitter 44 also determines the layering order of the sprites relative to each other. To superimpose a partially transparent foreground object onto a background object, for example, the layering order 54 includes the depth order of the objects and the Over image operator to be used to combine the layers depicting the foreground and background objects.

For more sophisticated shading models, the layering order can also include a description of the relationship of the factored layers that correspond to the term in the shading model. This relationship is typically in the form of an equation describing a linear combination of terms of the shading model with respect to the factored layers and the image operator or operators used to combine these layers. Just like a mathematical equation, the terms of the shading model typically have some inter-dependence, such as a requirement that they be combined in a particular order. Thus, the layering order includes this inter-dependence and is used to convey this information to the compositor.

The author of the scene can perform the splitting step manually, or it can be automated based on some author-specified criteria, some criteria pre-programmed into the system, or some adaptive criteria based on the regulation of the rendering resources. The objective of this stage is to factor the scene into elements that the system can render at independent spatial and/or temporal resolution. The scene can be factored based on geometry, the shading model, or a combination of both. For example, a fast moving car, its shadow, and a reflection in the window can be separate from each other and the slow moving background. We sometimes refer to the function of splitting the scene as factoring. Below we describe factoring of geometry and the shading model in more detail.

As illustrated in FIG. 2, each of the independent scene elements have a corresponding renderer 56, 58. The diagram of the renderers 56, 58 represents that the scene elements are rendered independently. It does not mean that the layered pipeline requires multiple parallel renderers to render each layer, although that is one way to implement a layered pipeline. It is possible to render each layer using the same renderer repeatedly, in which case, the renderers shown in FIG. 2 represent iterations through a single renderer. The renderer(s) can be implemented using a conventional architecture, using either a conventional software or hardware renderer.

To support a layered pipeline, the renderer should be able to render and store image layers separately, and should be able to devote some of its pixel fill capacity to composite the image layers into a final output image. This does not mean, however, that the pipeline must have a separate renderer and compositor. Layer composition can be emulated with rendering hardware that supports texture-mapping with transparency. To emulate the layered pipeline in this type of hardware, the renderer first converts an independent scene element to a texture, and then acts as a compositor by using texture mapping to combine the texture with another image layer.

One architecture specifically adapted to render parts of scene to separate layers is the rendering system described in U.S. Pat. No. 5,867,166 to Nathan P. Myhrvold, James T. Kajiya, Jerome E. Lengyel, and Russell Schick, entitled Method and System for Generating Images Using Gsprites, filed on Jun. 27, 1996, which is hereby incorporated by reference.

The output of each rendering is a sprite 50, 52. A sprite is a 2D rendering represented in sprite coordinates. It is important to note that sprite coordinates can be different from the screen coordinates. For example, a sprite may be rendered at a different spatial resolution than its display resolution. Also, the 2D sprite coordinates of a layer may have a different orientation than screen coordinates based on how a particular screen element is fit into the sprite's screen boundary. For example, a sprite may be warped (e.g., rotated, affinely warped) relative to screen coordinates to minimize the sprite area that does not overlap the object(s) assigned to the sprite. Also, once rendered, a sprite can be warped to approximate 3D motion or color changes at subsequent sampling times (e.g., for subsequent frames). Rather than re-render the sprite, the renderer may update the sprite's transform instead by computing a warp that approximates its appearance at a later sampling time.

In a layered pipeline, the sprite transform can be specified as input to the system, and it can be computed/updated in the renderer. As explained in further detail below, the graphics pipeline computes the sprite transform in two different cases 1) when a scene element is rendered to compute the initial transform from sprite space to screen coordinates; and 2) when the renderer updates the transform to approximate the sprite in a current frame without re-rendering.

The compositor 60 represents the stage in the rendering pipeline that combines the sprites or parts of the sprites to compute final pixel values for the output image. The compositor receives the sprites and the layering order as input, and combines pixels in the sprites at corresponding screen coordinates into final pixel values.

Since a sprite's coordinates are typically not the same as screen coordinates, the layered graphics pipeline has to transform each sprite to screen coordinates. In the high level architecture illustrated in FIG. 2, the compositor represents the portion of the system that transforms sprites to output coordinates and combines transformed pixel values to compute output pixels in the output image.

The compositor combines sprites using one or more image operators implemented within the compositor. This can include the standard Over operator, an Add operator, a Multiply operator and possibly other image operators.

The Over image operator can be defined as follows. Let A=[αA, α] be a first layer, and B=[βB, β] be a second layer, where A is the color and α is the coverage for the first layer, and B is the color and β is the coverage for the second layer, then the Over operator can be computed in the compositor as A Over B=[αA+(1−α)βB, α+(1−α)β].

The Add operator ("+") adds each sample in a first layer with a sample at a corresponding location in another image layer. The Multiply operator multiplies each sample in a first layer by a coefficient at a corresponding sample location in another layer. In addition to these operators, there are a number of conventional image operators for combining images as set forth in Compositing Digital Images, by Thomas Porter and Tom Duff, SIGGRAPH 1984, pp. 253–259. Any or all of these image operators can be implemented in the compositor to support shading operations.

The compositor can be implemented using special purpose hardware or software code that is independent from the renderer in the graphics pipeline. Alternatively, the renderer can emulate the function of the compositor by allocating some of its pixel fill capacity to combining image layers as explained above.

A layered pipeline decouples compositing of image layers from rendering object geometry. This "decoupling" is advantageous because compositing is inherently less complicated than rendering. Rendering 3D models typically includes a 3D to 2D transformation, hidden surface removal, anti-aliasing, and lighting or shading computations. In contrast, the compositing process involves performing simple image operations on 2D images. As such, a compositor can be implemented with a pixel fill rate that is much higher than the pixel rate of the renderer. While adding a compositor may increase the cost of the system, the compositor offsets this cost by reducing rendering overhead and possibly simplifying the renderer by moving image compositing operators to the compositor.

The layered pipeline has several advantages for real time computer graphics. First, layered rendering makes it easier to re-use renderings from previous frames. As noted above, the temporal resolution of the layers can vary relative to each other. By separating fast moving objects from slower background objects, the layered pipeline improves the usable coherence in the background layers. This reduces the number of geometric primitives that require rendering for each frame and frees up rendering capacity for other objects. This reduction in rendering overhead also frees up pixel fill capacity of the renderer.

Second, layered rendering more optimally targets rendering resources. Less important layers can be rendered at a lower spatial and temporal resolution to conserve resources for important layers. Lowering the spatial resolution for less important objects frees up pixel fill capacity for more important objects. Similarly, lowering the update rate for less important objects frees up rendering capacity (including pixel fill capacity) for more important objects.

Finally, the layered pipeline naturally integrates 2D and 3D. 2D scene elements, such as overlaid video, offline rendered sprites, or hand-animated characters are easily inserted as additional layers. This is critical because many content designers prefer to work in a 2D rather than 3D world.

Factoring

To exploit the advantages of the layered pipeline, the first step is to factor the scene into separate scene elements. Preferably, the scene should be factored to identify scene elements (or sets of scene elements) that can be rendered to separate layers at different update rates and spatial resolution.

Factoring the scene into layers can include both geometry and shading factoring. Below, we describe methods for performing both kinds of factoring.

FIG. 3 is a flew diagram showing steps for preparing models in a graphics scene for rendering in a layered pipeline. The first step 70 is to break the scene into "parts" such as the base level joints in a hierarchical animated figure. The parts are containers for all of the standard graphics elements such as polygon meshes, textures, materials, etc., required to render an image of the part. A part is the smallest renderable unit.

The second step 72 is to group the parts into layers according to the factoring methods described further below. The distinction is made between parts and layers to allow for reuse of the parts, for example in both a shadow map layer and a shadow receiver layer. Layer dependencies must be noted. For example, shadow layers and reflection layers depend on shadow-map layers and reflection-map layers, respectively, to provide depth maps and reflection images.

The final step 74 is to tag the layers with resource-use preferences relative to other layers in the scene. The preferences are relative so that total resource consumption can change when the total resources available for rendering change.

Geometry Factoring

Geometry factoring should consider the following properties of objects and their motions:

1. Relative velocity
2. Perceptual distinctness
3. Ratio of clear to "touched" pixels Relative velocity A sprite that contains two objects moving away from each other must be updated more frequently than two sprites each containing a single object. Velocity also generalizes to dimensions such as shading.

Figure 4B:
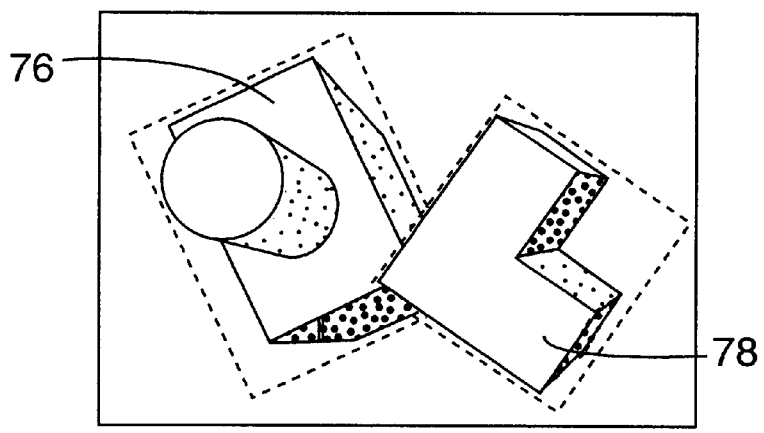
Figure 4C:
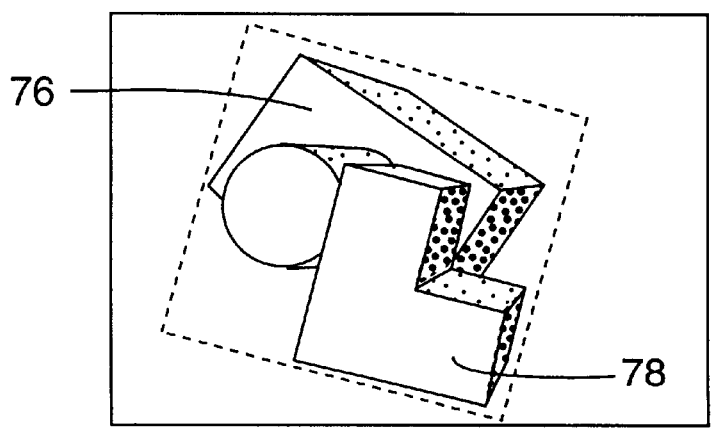

FIGS. 4A–C show a simple example demonstrating the benefits of assigning objects that have different velocities to different sprites. FIG. 4A shows objects 76, 78 assigned to separate sprites and their respective velocities. The dashed lines represent the screen boundaries of the sprites for each object, and the solid arrows show the velocities. Each sprite is a 2D array of sprite samples (pixel values) and has an associated sprite transform that maps the sprite samples to screen coordinates. In this example, the two objects are moving away from each other, and therefore, are assigned to separate sprites.

FIG. 4B shows these objects and their sprites in a subsequent frame of animation. Note that splitting the objects to separate layers improves the likelihood that each sprite can be re-used in subsequent frames because the appearance of the objects in each sprite does not change substantially from FIG. 4A to FIG. 4B. In contrast, aggregating both objects in a single sprite as in FIG. 4C will force the graphics pipeline to re-render the sprite at a higher rate as the objects within the aggregate sprite move away from each other because the motion of the objects can not be accurately represented with a 2D warp.

Perceptual distinctness

Background elements should be blurred by using a lower sampling rate. The main actor requires more samples in space and time. In order to make such tradeoffs, perceptually distinct objects must be separated into layers.

Ratio of clear to "touched" pixels

Aggregating many objects into a single layer typically wastes sprite area where no geometry projects. Finer decompositions are often tighter. Reducing wasted sprite space saves rendering resources especially in a chunked architecture where some chunks can be eliminated. More importantly, it makes better use of the compositor, whose maximum speed limits the average depth complexity of sprites over the display.

Factoring Shading

A shading model can also be factored into separate layers and combined using one or more image operators. In a layered pipeline, the shading model can be factored over an object or a set of objects in a scene rather than globally across the entire scene. The objective is to factor the shading model into layers to take advantage of temporal coherence and more effectively target rendering resources.

The extent to which the shading model can be computed using image operators on image layers depends, in part, on the capabilities of the compositor to combine images and accumulate intermediate results. The factors of the shading model are limited by the types of image operators supported in the compositor, and by the ability of thy compositor to accumulate intermediate results. For example, if the compositor only supports the Over operator, the shading model can only be factored in ways in which the Over operator can be used or adapted to combine the factored terms. In addition, if the shading model is factored into terms that need to be stored as intermediate results, the compositor should be able to accumulate intermediate results in one or more buffers.

Using a compositor that supports the standard Over image operator, any shading model with terms combined with the Add ("+") or Over operator may be split into separate layers. Also, the Over image operator can be adapted to approximate a multiply operator (multiplying an image by an array of shadow attenuation coefficients, for example).

Rather than use the Over operator only, the compositor can be designed to support additional image operators, such as the multiply operator, so that it can perform a wider variety of image operations more accurately. One important application of the multiply operator is for multiplying a sprite representing a fully illuminated scene element by a sprite representing an array of attenuation coefficients. For a fast-moving shadow on a slow-moving receiver, the layered pipeline can save rendering resources by only updating the fast-moving shadow and re-using sprites representing the receiver.

As examples of factoring the shading model, consider shading models for shadows and reflections. Shadows and reflections may be separated into layers, so that the blend takes place in the compositor rather than the renderer. To take advantage of temporal coherence, highlights from fast moving lights, reflections of fast moving reflected geometry, and animated texture maps should be in separate layers and rendered at higher frame rates than the receiving geometry. To take advantage of spatial coherence, blurry highlights, reflections, or shadows should be in separate layers and given fewer pixel samples.

Reflection terms can be split into layers because the reflection term is simply added to the rest of the terms in the shading model. Thus, a compositor that supports an Add operator for image layers can be used to combine a reflection layer with other layers in the shading model. Specifically, a compositor supporting the Over operator can add image layers together by setting $\alpha$ to zero so that the Over operator is equivalent to an ADD operation.

The separation of shadow layers is different than reflection layers because the shadowing term multiplies each term of the shading expression that depends on a given light source. This multiply operation can be supported by a Multiply operator in the compositor or can be approximated using the Over operator as explained in further detail below.

Consider the example used in the background where a shadow layer modulates the fully illuminated scene, and a reflection layer adds a reflection. As shown in FIG. 5, this type of shading model can be factored into at least three layers: the shadow layer, the fully illuminated layer, and the reflection layer. The scene 80 includes the geometric and shading model. The splitter 82 represents the step of factoring the shading model into three layers 84, 86, 90, each with independent quality parameters 92, 94, 96.

The renderer 98 independently renders the shadow layer to sprite 1. Rendering the shadow layer includes rendering the scene from the perspective of the light source to generate a depth map, and then rendering from the perspective of the viewpoint to determine the shadow attenuation coefficients using the depth map. The shadow layer can be computed at a different resolution from the screen resolution and can be re-used for more than one frame.

The renderer 100 independently renders the fully illuminated layer by rendering a fully illuminated scene from the perspective of the viewpoint. The result of this rendering step is Sprite 2. In a typical case, the splitter will separate geometry first, and then lighting passes because different geometric objects usually have different lighting models. Thus, there often are one or more shading layers for each of the geometric layers.

The renderer 102 independently renders the reflection layer by rendering the scene from a reflected camera. The result is Sprite 3.

After the renderer renders Sprites 1–3, thu compositor 104 can combine them using an image operator according to the shading model. In the present example, the compositor completes the shadowing operation by multiplying sprite 2 representing the illuminated scene by sprite 1 representing the shadow layer and then adding the reflection layer.

As another example, consider a shading model with two textures and a shadow, $S(N \cdot L)(T_1+T_2)$ where S is the shadowing term, N is the normal to the light, L is the light direction, and $T_1$ and $T_2$ are texture lookups. This shading model can be factored into three layers: S, $(N \cdot L)T_1$, and $(N \cdot L)T_2$, which are composited to produce the final image. Each of these factors can be rendered to separate layers, at different sampling resolutions in space and time, and interpolated to display resolutions. To construct an output image, the compositor adds the second and third layers together with an Add image operator and then multiplies the result by the shadow layer using a Multiply image operator.

To summarize, terms in the shading model can be factored to image layers, rendered independently, and then combined using image operators. The image layers represent the terms in the shading model such as:

1) a shadowing term (called the shadow layer or image), modeling shadows cast by shadowing objects on shadowed objects,
2) a lighting term representing a rendering of an object illuminated by a light source (multiple light sources can be factored to separate lighting terms and added together),
3) a texture layer, representing a rendering of a texture mapped to an object's surface, and
4) a reflection term, modeling the reflection of one object on the surface of another.

Image layers can also represent combinations of these terms, such as a rendering of an object, illuminated by a light source and created using a texture look-up.

Use In Authoring Tools

Factored shading expressions are useful in authoring. When modifying the geometry and animation of a single primitive, the artist would like to see the current object in the context of the fully rendered and animated scene. By pre-rendering the layers that are not currently being manipulated, the bulk of the rendering resources may be applied to the edited layer or layers. The layers in front of the edited layer may be made partially transparent (using a per-sprite alpha multiplier) to allow better manipulation in occluded environments. By using separate layers for each texture shading term, the artist can manipulate the texture-blending factors interactively at the full frame rate. This enables the author to make changes to the attributes of an object, such as changing a blend factor, and then immediately view how the change in the blend factor changes the appearance of the object in an animation sequence.

For shade sprites, the blend factors are the weights in the shading expression. For example, if there are two textures in a shading expression such as D (a1T1+a2T2), then the expression is factored into two layers a1(D)(T1) and a2(D)(T2) with the two weights factored out as the per-layer alpha multipliers. Once factored from the shading expression, the user of the authoring tool can modify the weights a1 and a2 in real-time. For example, the user can make changes to the blend factor and then playback the animation sequence. During playback, the authoring tool only has to render the layer or layers being edited.

For geometry sprites, the alpha multiplier may be used to make all the sprites in front of the edited layer be partially transparent. This enables the user to observe how the edits to the object affect the appearance of the object during playback of the animation sequence.

The layers that the user is not currently editing may be either shade sprites or regular geometry sprites. The key idea is that the other layers do not have to be re-rendered. Instead, the layers are just re-composited. All of the rendering resources can be applied to the current object being edited.

An authoring tool that allocates rendering resources to layers being edited by the user and that combines the edited layers with pre-rendered layers can be implemented in the layered graphics rendering pipeline described below. Specifically, the sprite compositor described below can be used to combine pre-rendered image layers with currently rendered layers representing an object being rendered.

Image Rendering

In the layered pipeline, image rendering is the process of creating image layers corresponding to the factored geometry and shading terms. Once created, each image layer can be warped to approximate changes in corresponding geometry or shading terms from one frame to the next. The term "warp" includes not only scaling, translation, and rotation, but also more generally to an affine transform or perspective transform. The warp may also include bilinear or quadratic transformations, and piecewise versions of any of these types of transformations.

To independently control the rendering of independent layers, the layered pipeline needs to manage the object geometry assigned to independent layers. It can perform this layer management using bounding volumes of the layer's geometry and characteristic points that give an approximation of the motion of the geometry over time. The layered pipeline has a graphics preprocessor that performs sprite management functions including:

1) computing sprite transforms mapping sprites to output coordinates, tracking changes in sprites from frame to frame,
2) computing warps to approximate changes in sprites without re-rendering,
3) computing the fidelity of warped sprites, and
4) regulating rendering resources.

In the description to follow, we address each of these functions. To compute the sprite transform, the preprocessor computes the size and orientation of the sprite based on the bounding volume, and determines how the sprite maps to screen coordinates. The preprocessor projects the vertices of the bounding volume to the screen and then fits a quadrilateral (preferably a rectangle) around the 2D projection. The preprocessor then derives the sprite transform from the edges of the quadrilateral.

The preprocessor uses the characteristic points to compute a 2D image warp for the sprite and to determine whether this warp is sufficiently accurate to approximate motion of the object. If the warp is sufficiently accurate, the preprocessor updates the sprite transform with the warp. If not, the preprocessor adds the sprite to a list of sprites requiring re-rendering. We address ways to adjust a sprite's spatial resolution and update rate to regulate the use of rendering resources in more detail below.

Tracking Object Geometry

Our implementation of the layered pipeline tracks the motion of the original geometry using a characteristic bounding polyhedron, usually containing a small number of vertices. For rigidly moving objects, the vertices of the characteristic polyhedron, called characteristic points, are transformed using the original geometry's time-varying transform. Non-rigidly deforming geometry are tracked similarly by defining trajectories for each of the characteristic points.

Figure 6:
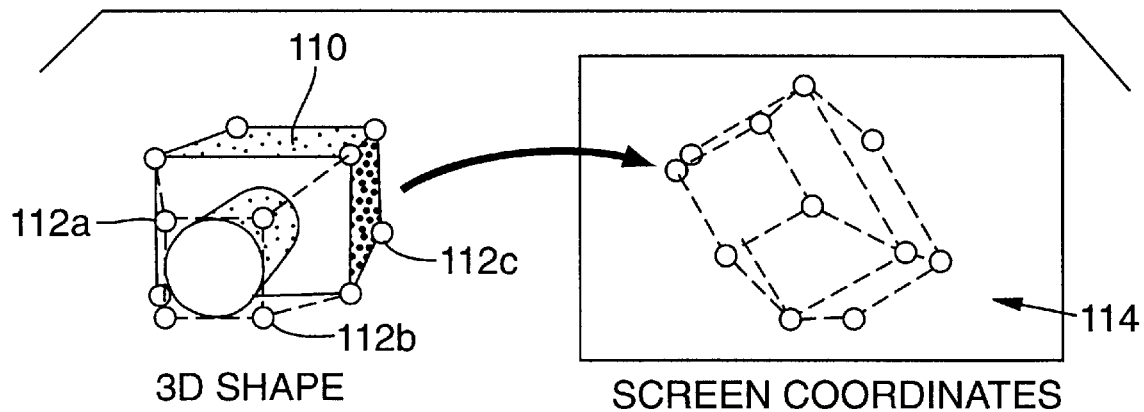
FIG. 6 illustrates an example of a characteristic bounding volume to compute the position and orientation of an object's sprite on a display screen and to track the motion of the object.

FIG. 6 illustrates an example of the characteristic bounding polyhedron of an object 110. In FIG. 6, the vertices of the characteristic bounding polyhedron are represented as small circles (e.g., 112a–c), and the dashed lines connecting the vertices form its surface polygons. The transform T maps these vertices to screen space 114. Note that the characteristic bounding polyhedron matches the overall shape of the original object 110 but has many fewer vertices.

The bounding polyhedron for an object can be computed and stored with the object's model at authoring time or can be computed from the model at rendering time. Rigid bodies can be grouped by combining the characteristic bounding polyhedra, or by calculating a single bounding polyhedron for the whole.

Sprite Extents

For a particular frame, there is no reason to render off-screen parts of the image. But in order to increase sprite reuse, it is often advantageous to expand the clipping region beyond the screen extents to include some of this off-screen area. When the preprocessor computes the size and orientation of a sprite, it clips the sprite's bounding volume to the clipping region. Extending the clipping region expands the size of sprites overlapping the extents of the clipping region. While this initially can increase rendering overhead, it later reduces it by increasing the chances that a sprite can be re-used as it moves onto the screen.

Figure 7A:
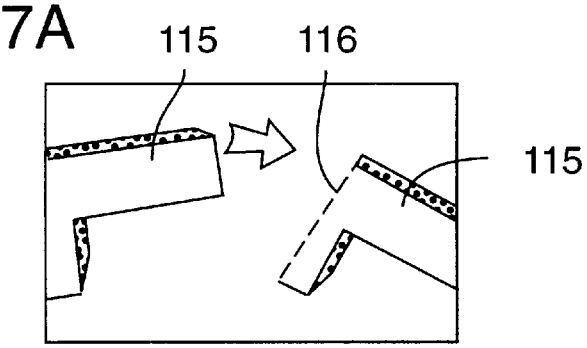
FIGS. 7A–B illustrate how to expand the viewing frustum beyond the screen area to increase the sprite extents and make rendered sprites more likely to be re-usable.

FIG. 7A shows how clipping a sprite to the screen (solid box) prevents its later reuse because parts of the clipped image later become visible. This figure shows an object 115 moving across the screen from left to right. The object is rendered initially as it enters the screen on the left. If the object is clipped to the screen extent, it will not be re-usable as it moves to the right because the off-screen section of the object is not initially rendered. The dashed line 116 on the object shows where the object has been clipped.

Figure 7B:
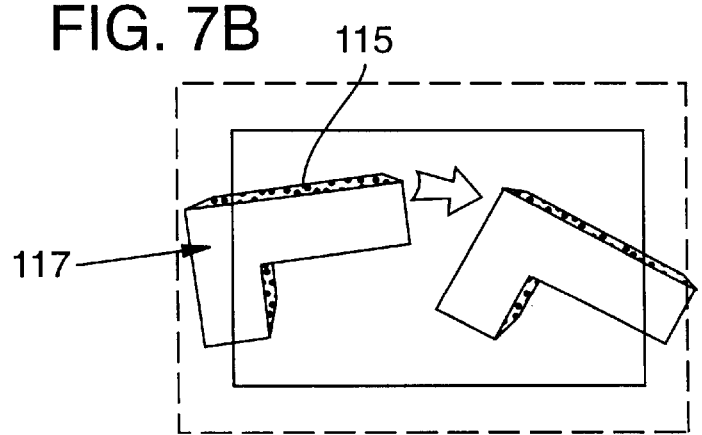

In FIG. 7B, the sprite extent (dashed box) has been enlarged to include regions 117 of the object 115 that later become visible as it moves from left to right. The extra area to include in the sprite extent depends on such factors as the screen velocity of the sprite (which suggests both where and how much the extents should be enlarged) and its expected duration of re-use.

The Sprite Transform

When creating a sprite image, we must consider a new transform in the standard pipeline in addition to the modeling, viewing, and projection transforms: a 2D transformation that transforms samples in sprite coordinates to screen coordinates.

If T is the concatenation of the modeling, viewing, and projection matrices, a screen point p' is obtained from a modeling point, by p'=Tp. For the sprite transformation, p'=Aq, where A is an affine transform and q is a point in sprite coordinates. To get the proper mapping of geometry to the display, the inverse 2D affine transform is appended to the projection matrix, so that $q=A^{-1}Tp$ results in the same screen point $p'=Aq=AA^{-1}Tp=Tp$.

Figure 8:
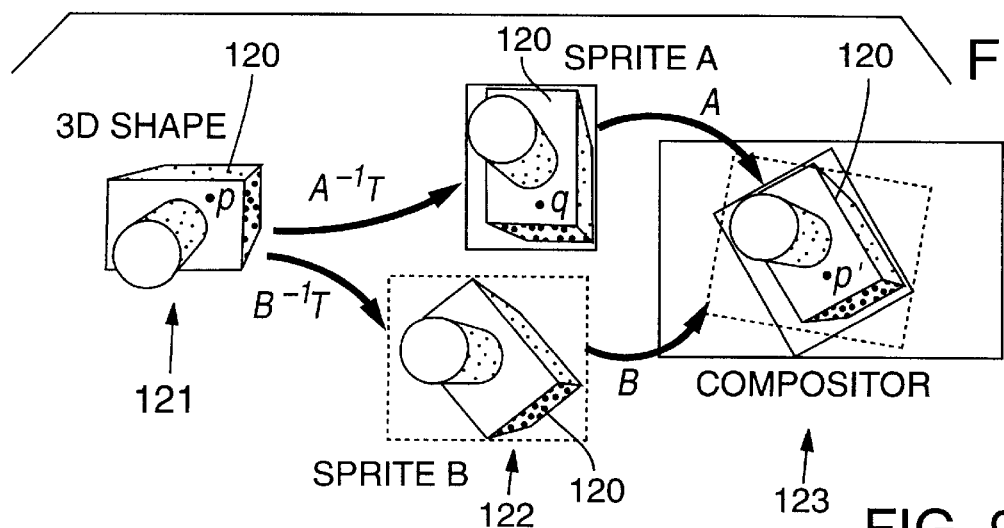
FIG. 8 illustrates two examples of computing a sprite transform to highlight the advantage of finding a tight fitting sprite for a projected object.

FIG. 8 is a diagram illustrating an example of mapping an object 120 from modeling coordinates 121 to sprite coordinates 122, and then mapping the object 120 from sprite coordinates to the screen coordinates 123. In this example, sprite transform A makes a better fit than sprite transform B because the sprite fits much tighter around the object 120.

The choice of matrix A determines how tightly the sprite fits the projected object. A tighter fit wastes fewer image samples. To choose the affine transform that gives the tightest fit, the preprocessor projects the vertices of the characteristic bounding polyhedron to the screen and clips to the expanded sprite extent. Then, using discrete directions (from 2–30, depending on the desired tightness), the preprocessor calculates 2D bounding slabs as set forth in Ray Tracing Complex Scenes, by Timothy L. Kay and James T. Kajiya, SIGGiRAPH 1986, pp.269–278. Alternately, the preprocessor may choose slab directions by embedding preferred axes in the original model, and transforming the axes to screen space.

Figure 9:
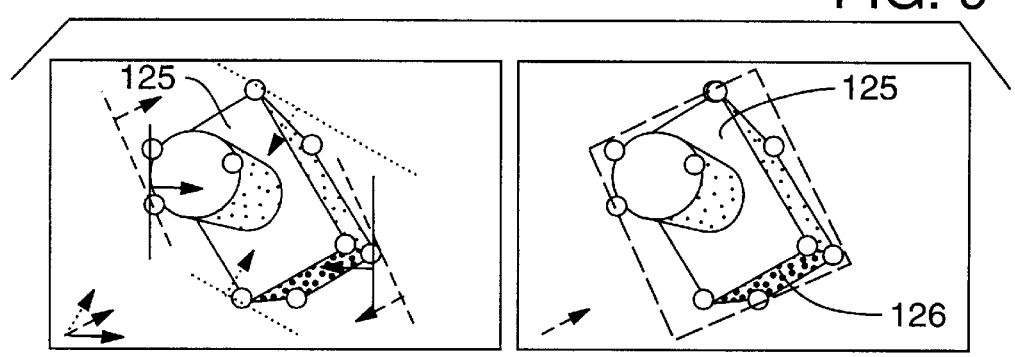
FIG. 9 illustrates a method for computing sprite edges in screen coordinates for a projected shape.

FIG. 9 illustrates how to compute the bounding slabs on a simple object 125. As shown in FIG. 9, bounding slabs are obtained by taking the external values of the dot product of each slab direction with the characteristic points. A tight-fitting initial affine transform can be calculated by taking the minimum area rectangle or parallelogram that uses the slab directions. FIG. 9 shows a bounding rectangle 126 in dashed lines, computed using this approach.

Using the bounding slabs, the preprocessor computes the rectangle with the smallest area that fits the transformed characteristic points. The origin and edges of the rectangle determine the affine matrix. Another approach is to search for the smallest area parallelogram, but this can cause too much anisotropy in the resulting affine transformation.

Spatial Resolution

The choice of affine matrix A also determines how much the sprite is magnified on the display. Rendering using a sampling density less than the display resolution is useful for less important objects, or for intentional blurring. The default is to use the same sampling density as the screen, by using the length in pixels of each side of the parallelogram from the previous section.

Figure 10A:
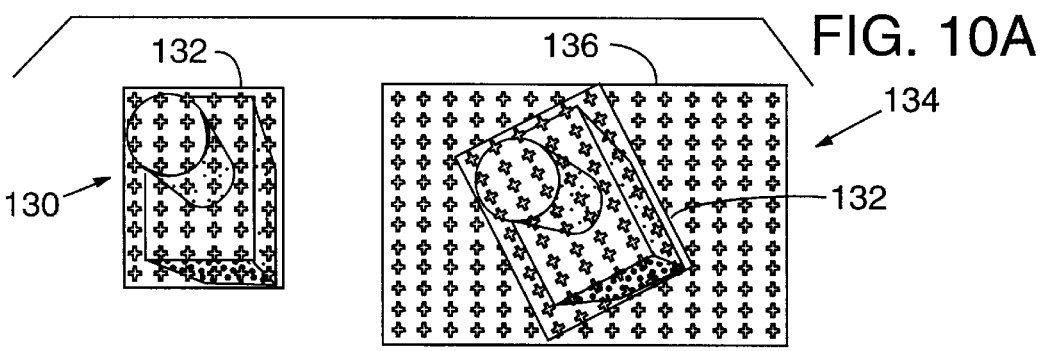
FIGS. 10A–B illustrate how an image layer can be rendered to a different spatial resolution than the screen resolution.
Figure 10B:
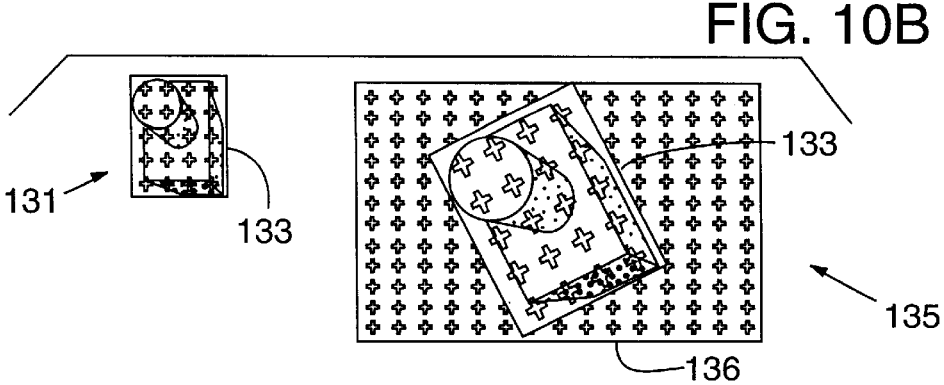

FIGS. 10A–B illustrate two examples demonstrating that the spatial resolution of a sprite representing a rendering of a 3D object may be different from final display resolution. The sampling density of the sprite in FIG. 10A is the same as the screen resolution; and the sampling density of the sprite in FIG. 10B is lower than the screen resolution.

The left side 130, 131 of FIGS. 10A–B shows the object in sprite space, superimposed over sprite coordinates. The boundaries 132, 133 of the sprite on the left and right sides of FIGS. 10A–B are its sprite boundaries or edges. The right side 134, 135 of FIGS. 10A–B shows the sprite and the sprite coordinates within the sprite edges warped to the screen space. The screen boundaries are represented by the solid lines 136 enclosing the array of screen coordinates. Note that the sprite coordinates do not map precisely to integer screen coordinates in either FIG. 10A or 10B. The pixel values at a given pixel location in screen coordinates can be computed using either a forward mapping (sprite to screen coordinates) or backward mapping (pixel to sprite coordinates) and then filtering sprite samples (sprite pixels) to compute pixel values at each screen coordinate within the sprite edges.

The sampling density of the sprite coordinates is the same as the screen coordinates in FIG. 10A, but is lower in FIG. 10B. Rendering the sprite at a lower sampling density uses less pixel fill capacity but introduces more blur, assuming an antialiased rendering.

For a linear motion blur effect, the sprite sampling along one of the axes may be reduced to blur along that axis. The sprite rendering transformation should align one of the coordinate axes to the object's velocity vector by setting the bounding slab directions to the velocity vector and its perpendicular.

Rendering a Scene Element to the Sprite

Once the preprocessor has computed the sprite transform, including the spatial resolution of the sprite, the layered pipeline can then render the scene element(s) assigned to the layer to the sprite. The rendering process can be implemented using conventional 3D graphics rendering techniques, or a chunking architecture as set forth in U.S. Pat. No. 5,867,166.

Image Warps

To reuse a rendered sprite image in subsequent frames, our implementation uses a 2D image warp to approximate the actual motion of the object. The preprocessor in our implementation uses the projected vertices of the characteristic bounding polyhedron to track the object's motion.

Figure 11:
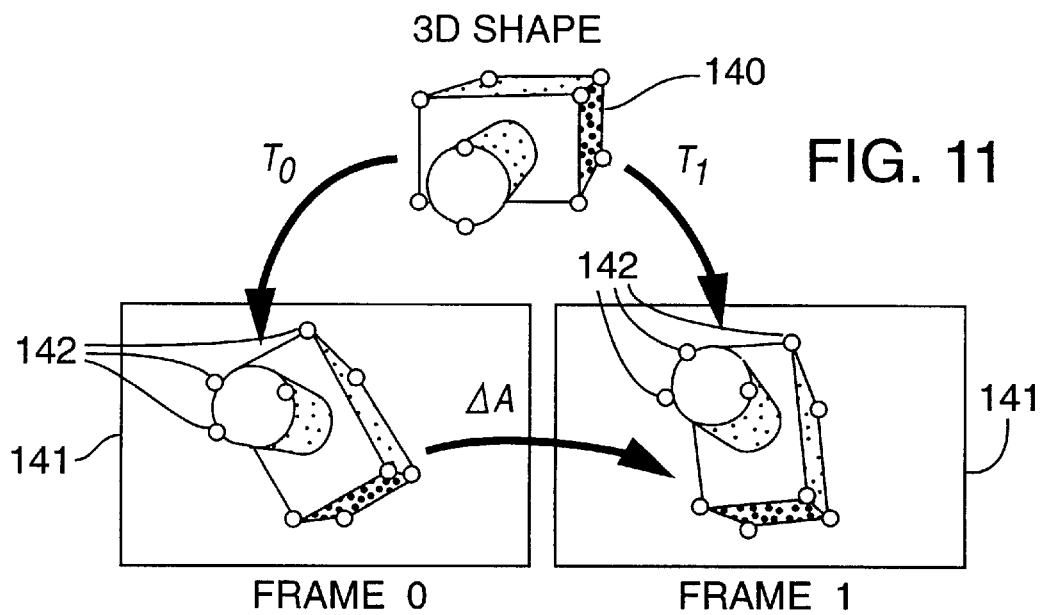
FIG. 11 is a diagram illustrating how to compute a 2D warp to approximate motion of an object from its initial rendering to a later frame.

FIG. 11 is an example illustrating how to use the characteristic points to track the motion of a 3D shape 140 from an initial frame (Frame 0) to a later frame (Frame 1). The transforms, $T_0$ and $T_1$, transform the 3D shape 140 from modeling coordinates to the screen 141 at first (Frame 0) and second sampling times (Frame 1), respectively. The solid circles (e.g., 142) highlight the location of the characteristic points in each of the frames.

Using the transform $T_1$, the preprocessor computes the screen position of the characteristic points in frames 0 and 1 and then computes a transform that warps the same characteristic points from frame 0 to their location in frame 1. The preprocessor projects the characteristic points on the three-dimensional shape to the screen and uses them to derive a transform $\Delta A$ that best matches the original points to the points in the new frame. The solid black circles show the points from frame 0 transformed by $\Delta A$.

To reuse images where objects are in transition from off-screen to on-screen, and to prevent large distortions (i.e., ill-conditioning of the resulting systems of equations), the characteristic bounding polyhedron is clipped to the viewing frustum, which may be enlarged from the display's as discussed above. The clipped points are added to the set of visible characteristic points and used to determine an approximating sprite transformation, using a simple least-squares match discussed further below.

Figure 12:
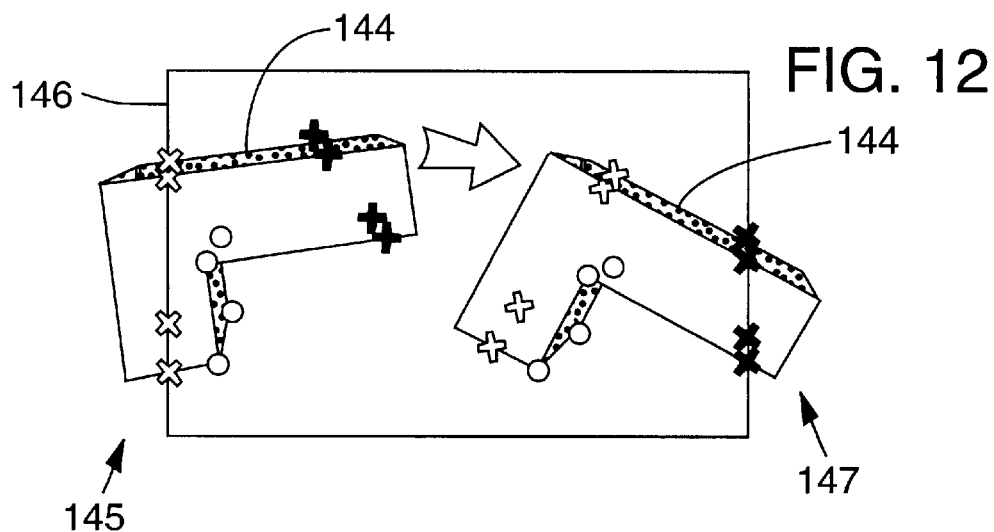
FIG. 12 is a diagram illustrating how an object's characteristic polyhedron is clipped to a viewing frustum and how the clipped points are added to the set of characteristic points used to compute a 2D warp of the object's sprite.

FIG. 12 shows an example of clipped characteristic points on a moving object 144. The left side 145 of the viewing frustum 146 shows the position of object 144 at the time of its last rendering. The clipped points at this sampling time are marked with an X. At the time of the current frame, the object 144 has moved to the right side 147 of the viewing frustum. The clipped points at this sampling time are marked with a bold X to distinguish them from the other clipped points. The set of clipped points from the last rendering and current frame are added to the set of characteristic points and used to compute the sprite transform that approximates the motion of the object.

Affine Warps

A 2D affine transform may be represented by a 2×3 matrix, where the rightmost column is the translation and the left 2×2 matrix is the rotation, scale, and skew.

$$A = \begin{bmatrix} a & b & c \\ d & e & f \end{bmatrix}$$

Let P be the time-varying set of projected and clipped bounding polyhedron vertices, ignoring the z values and adding a row of 1's to account for the translation, $$P = \begin{bmatrix} x_0 & & x_{n-1} \\ y_0 & \cdots & y_{n-1} \\ 1 & & 1 \end{bmatrix}$$

where n is the number of points (at least 3 for the affine transform). Let $\hat{P}$ be the matrix of characteristic points at the initial time and P be the matrix at the desired time t.

In an affine transform, the x and y dimensions are decoupled and so may be solved independently. To solve $A = \hat{P}P$ at time t for the best A, in the least-squares sense, we use the technique of normal equations:

$$A\hat{P}\hat{P}^T = P\hat{P}^T$$

$$A = P\hat{P}^T(\hat{P}\hat{P}^T)^{-1}$$

The technique of normal equations works well in practice, as long as the projected points are reasonably distributed. Adding the clipped characteristic points ensures that $\hat{P}\hat{P}$ is not rank deficient. Much of the right hand side may be collected into a single vector K that may be reused for subsequent frames.

$$K = \hat{P}^T(\hat{P}\hat{P}^T)^{-1}$$

$$A = PK$$

The step of calculating K requires the accumulation and inverse of a symmetric matrix.

Other Types of 2D Image Warps

While we have specifically discussed affine transforms to this point, it is also possible to use other 2D image warps to approximate motion of 3D geometry. For example, other possible types of warps include: 1) pure translation, 2) translation with isotropic scale, 3) translation with independent scale in X and Y, 4) general perspective. We experimented with each of these types of warps for a variety of types of rigid bodies including both planar and non-planar examples. We also tried animated trajectories for each body including translations with a fixed camera, translations accompanied by rotation of the body along various axes, and head turning animations with fixed objects. Our experiments attempted to measure: 1) update rate as a function of maximum geometric error, and 2) perceptual quality as function of update rate. The geometric error is the distance between the current position of the characteristic points in screen coordinates and the position of the characteristic points from the last rendering, warped by the sprite transform to screen coordinates.

We ran a number of experiments to simulate each of the 2D image warps listed above, including the general affine warp. In our experiments, a simulator (a programmed computer) computed the update rate for each type of warp using a threshold on the geometric error. If the error of the warped sprite did not exceed the threshold, the simulator re-used the sprite; otherwise, it re-rendered the sprite for the current frame. The simulator computed sprite transforms for each type of warp using two forms of error minimization: minimizing maximum error over all characteristic points and minimizing the sum of squares error. Our experiments confirmed the merit of the affine transform, even relative to the more general perspective transform.

Color Warp

Images can be warped to match photometry changes as well as geometric changes. U.S. Pat. No. 5,867,166 describes a method for computing a color warp to approximate photometry changes. This method generally includes:

1) selecting characteristic points with normals to enable sampling of the lighting model;
2) computing a color warp to approximate the change in the photometry at the characteristic points at the initial rendering and at a later frame; and
3) applying the color warp to the initial rendering to approximate the photometric change.

One form of the color warp is a per-sprite color multiplier that scales each sprite sample in the same way. The preprocessor can compute this color multiplier that best matches the change in photometry using a least squares technique that best matches the original color values of the characteristic points to the new color values.

Independent Quality Parameters

Since warped sprites only approximate a fully rendered sprite, we use metrics to measure the fidelity of sprites. We refer to these metrics as "fiducials." U.S. Pat. No. 5,867,166 describes a position metric (which we refer to as a geometric fiducial) and briefly discusses a lighting metric (which we refer to as a photometric fiducial). Here, we recap the geometric fiducial, describe specific lighting metrics called "photometric fiducials," and describe two additional fiducials, sampling and visibility fiducials. In sum, there are four types of fiducials: geometric, photometric, sampling and visibility.

Geometric fiducials measure errors in the screen-projected positions of the geometry. Photometric fiducials measure errors in lighting and shading. Sampling fiducials measure the degree of distortion of the image samples. Visibility fiducials measure potential visibility artifacts.

When measuring the error of approximating motion or shading terms with warped sprites, it is preferable to use conservative measurements where possible. However, heuristic measurements can be used as well if they are efficient and effective. Any computation expended on warping or measuring approximation quality can always be redirected to improve 3D renderings, so the cost of computing warps and fiducials must be kept small relative to the cost of rendering.

Geometric Fiducials

A geometric fiducial is a metric for measuring the difference in position of warped characteristic points and their actual position in screen coordinates for a particular frame. This type of fiducial is described in U.S. Pat. No. 5,867,166, incorporated by reference above. The following description gives a recap of the geometric fiducial.

Let $\hat{P}$ be a set of characteristic points from an initial rendering, let P be the set of points at the current time, and let W be the warp computed to best match $\hat{P}$ to P. Then the geometric fiducial is defined as $$F_{geom} = \max_i \| P_i - W\hat{P}_i \|$$

Figure 13:
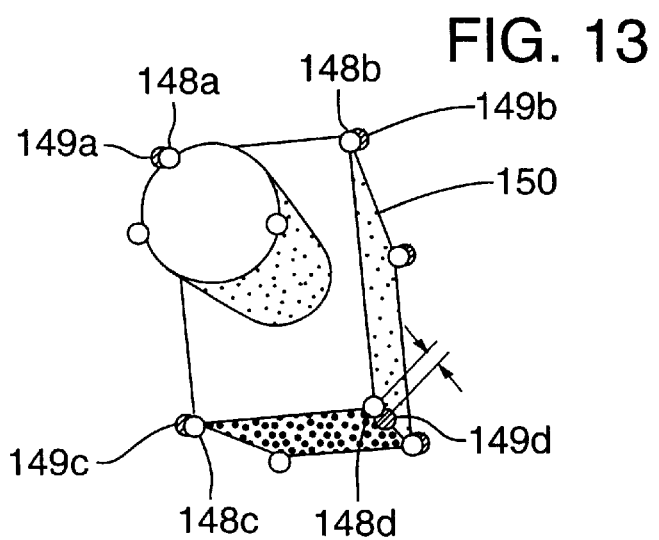
FIG. 13 is a diagram illustrating how to compute a geometric error or "fiducial" at the characteristic points of an object.

FIG. 13 illustrates the geometric error between warped characteristic points 148a–d and corresponding characteristic points 149a–d of an object 150 for the current frame. The warped characteristic points 148a–d are represented as the empty circles while the corresponding characteristic points 149a–d for the current frame are cross-hatched. As shown at points 148d, 149d, the geometric error is the maximum pointwise distance between the warped and current characteristic point.

Photometric Fiducials

Our implementation of the layered pipeline uses two approaches to approximately measure photometric errors. The first approach uses characteristic points augmented with normals to point sample the lighting. Let $\hat{C}$ be the colors that result from sampling the lighting at the characteristic points at the initial time, and C be the sampled colors at the current time. Let $W_C$ be the color warp used to best match $\hat{C}$ to C. Then the shading photometric fiducial is defined to be the maximum pointwise distance from the matched color to the current color.

$$F_{photo} = \max_i \| C_i - W_c \hat{C}_i \|$$

Figure 14:
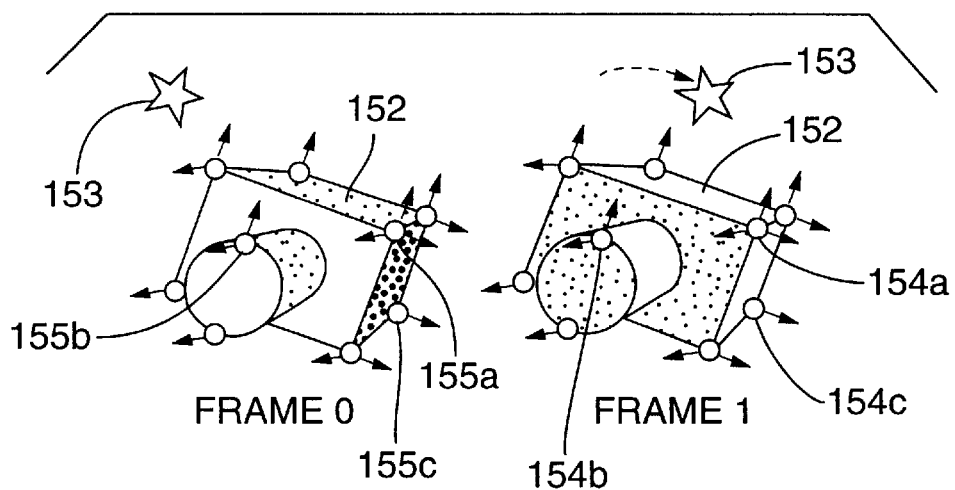
FIG. 14 is a diagram showing one type of photometric fiducial using normals to sample lighting changes.

FIG. 14 illustrates an example of sampling the lighting change on an object 152 as a light source 153 changes position from frame 0 to frame 1. The point-sampled photometric fiducial measures lighting change by sampling the shading at the current frame's characteristic points (e.g., 154a–c) with normals and comparing with samples of the initial frame's characteristic point shading (e.g., 155a–c). In this example, the shading of the object's surfaces changes as the light source changes position from frame 0 to frame 1. The preprocessor in the graphics pipeline detects this change by sampling the shading at the characteristic points.

Another approach is to abandon color warping and simply measure the change in photometry from the initial rendering time to the current. Many measures of photometric change can be devised; the implementation described here measures the change in the apparent position of the light. Let $\hat{L}$ be the position of the light at the initial time and L be its position at the current time (accounting for relative motion of the object and light). For light sources far away from the illuminated object, the preprocessor can be programmed to measure the angular change from $\hat{L}$ to L with respect to the object, and the change in distance to a representative object "center". For diffuse shading, the angular change essentially measures how much the object's terminator moves around the object, and the change in distance measures the increase or decrease in brightness. Light sources close to the object are best handled with a simple Euclidean norm on the source positions. For specular shading, changes in the viewpoint can be measured as well.

Figure 15:
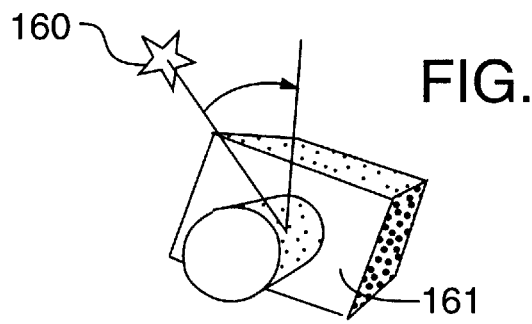
FIG. 15 is a diagram showing a second type of photometric fiducial based on the motion and angle of a light source relative to an object.

FIG. 15 shows an example depicting the change in the position of a light source 160 from frame 0 to frame 1 relative to an object 161. As the angle of the light source changes relative to the object, the surfaces visible and not visible from the light source also change. The angle of the light source, therefore, approximately indicates the extent to which surfaces become illuminated or shadowed as the light source moves. As the light source moves toward or away from the surface of the object, the intensity of the light at the surface also changes. To implement this type of fiducial, the preprocessor places a threshold on the angle and the change in distance of the light source and triggers re-rendering when this threshold is satisfied. Alternatively, the preprocessor can measure the value of the angle and the change in distance and use these values to compute the cost of re-using the sprite relative to the cost of other sprites.

Sampling Fiducials

Sampling fiducials measure the degree of expansion, contraction, and distortion of the samples of warped sprite. The objective is to measure the distortion of a sprite sample (or sprite samples) as a result of being warped to the screen coordinate space. The sampling fiducial computes distortion by determining how the 2D transform deviates from an isometric map; i.e., how it changes lengths and/or angles between pre-and post-warped tangent vectors. For some types of 2D transforms, such as an affine transform, the sampling distortion is spatially invariant, and can be computed by measuring at a single arbitrary image sample. For other types of transforms, such as the perspective transform, the sampling distortion is spatially varying, and should be measured at various image locations, or conservatively bounded across the relevant image region.

Figure 16:
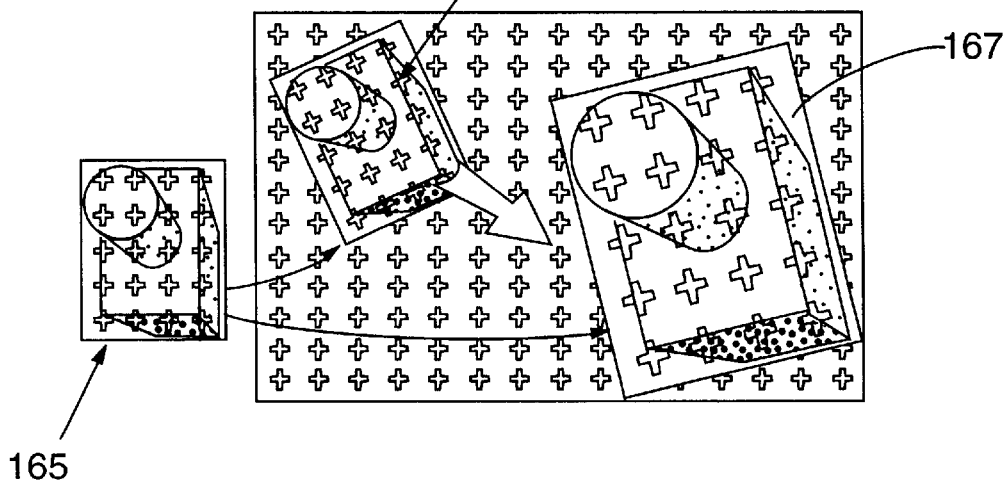
FIG. 16 is an example illustrating sampling distortion and a sampling fiducial.

FIG. 16 shows an example of an image warp where the sampling fiducial is particularly useful for measuring distortion of the warped image. In the example of FIG. 16, the viewpoint is moving closer to an object without changing the lights or the view. The initial rendering of the object to its associated sprite 165 has the same spatial resolution as the screen. The sprite transform at the initial rendering is $A_0$, which maps the sprite to the screen coordinates. FIG. 16 shows the initial rendering 166 in screen space with the sprite samples superimposed over it to show its initial resolution relative to the screen resolution. The sprite transform for a later frame is $A_1$. Note that the warped sprite 167 has a larger spacing between sprite samples.

In this particular example, both the geometric and photometric fiducials indicate the sprite has high fidelity to the desired image. However, the sampling fiducial indicates that the sprite is getting blurry. As the sprite is scaled to cover a larger screen area, the sprite samples get stretched, and this stretching makes the sprite appear blurry even if the geometric and photometric error remain the same.

Scaling a sprite sample to cover a smaller screen area can also cause visual artifacts due to the limitations of the rendering system. Consider the example shown in FIG. 16 with the variation that the object is moving farther away from the viewpoint with a translation and scale. As the screen size of the sprite becomes smaller relative to its size in sprite space, it becomes more difficult to filter sprite samples during the process of mapping the sprite to screen coordinates. In some implementations, filtering capabilities of the hardware limit the amount that sprite images can be "minified" and anisotropically scaled before perceptible artifacts arise.

The sampling distortion of an affine warp can be measured as the distortion of a horizontal and vertical unit vector in sprite space, when warped to screen space. Recall that the affine sprite transform call be represented by the 2×3 matrix A:

$$A = \begin{bmatrix} a & b & t_x \\ c & d & t_y \end{bmatrix}$$

where the rightmost column is the translation and the left 2×2 matrix is the rotation, scale, and skew. The sampling distortion is proportional to the change in length of these unit vectors when the sprite transform is applied to them. Stated more generally, the sampling distortion measures the distortion of a sprite's sampling grid when transformed to output device coordinates.

One specific way to measure this distortion is to compute the singular values of the Jacobian of the mapping function. The affine warp has a spatially invariant Jacobian given by the left 2×2 part of the 2×3 matrix, for which the two singular values are easily calculated. The 2×2 part of the affine transform matrix can be represented as:

$$\begin{bmatrix} a & b \\ c & d \end{bmatrix} = U \begin{bmatrix} S_1 & 0 \\ 0 & S_2 \end{bmatrix} V$$

where U and V are rotation matrices, and $S_1$ and $S_2$ are the singular values computed from the terms, a, b, c, and d. The singular values measure the minimum and maximum length of the result of applying the Jacobian to an arbitrary unit tangent vector. The extent to which these singular values differ from 1 indicates the distortion of a sprite sample. When close to 1, the transform is close to the identity and thus produces no distortion.

One way to quantify the distortion is to compute the magnitude of the larger and smaller singular values, and the ratio of the larger over the smaller value. Our implementation measures the magnitude of the larger singular value (which measures the greatest magnification), the magnitude of the smaller (which measures the greatest minification), and their ratio (which measures the maximum anisotropy). For transforms with spatially varying Jacobians such as the perspective warp, the singular values vary over the image. In this case, a bound for the singular values over the input domain can be computed.

Visibility Fiducials

Visibility fiducials measure potential visibility artifacts by counting the number of back-facing to front-facing transitions in the set of characteristic points, and testing if edges of clipped sprites will become visible. Again, the simplified characteristic geometry makes these calculations tractable.

The back-facing to front-facing transitions approximate the change in visibility of the surfaces on an object from an initial frame to the current frame. To compute these transitions, our implementation compares normal of the characteristic points with the direction of the viewpoint and stores a value indicating whether a surface on the characteristic geometry is front-facing or back-facing After the initial rendering, the preprocessor repeats this test for the characteristic points at their current position and then determines the change in visibility based on the transitions from back to front facing relative to the initial rendering.

FIG. 14 illustrates an example of how surface normals can be stored along with characteristic points. To implement the visibility fiducial for this type of model, the preprocessor traverses the list of characteristic points, computes visibility for each surface of the characteristic polyhedron, and then stores a visibility value along with the characteristic points. For the sake of illustration, assume that the light source 153 is the viewpoint and that the viewpoint moves as shown from frame 0 to frame 1. At frame 1, the preprocessor traverses the list of characteristic points, computes visibility, and then compares the current visibility value with the initial visibility value to determine the number of transitions. The umber of transitions from back to front facing is one way to quantify the cost of not re-rendering the sprite for the current frame.

Our implementation also uses clipping information as part of the visibility fiducial. As described above, the preprocessor clips characteristic bounding polyhedron to a viewing frustum that extends beyond the screen boundary (the expanded sprite extent). The preprocessor adds the clipped points to the set of characteristic points and uses the clipped points to mark the clipped edge of a sprite. At each subsequent frame, the preprocessor can then check the clipped edge to determine whether it has entered the screen.

Compositing

A layered graphics rendering pipeline generates an output image by compositing image layers to produce output pixels. If the image layers are not in a common coordinate system, the graphics pipeline has to transform the samples in the image layers to a common coordinate system before compositing them. The compositor can then combine samples from different layers using image operators.

The compositor can be designed to combine pre-transformed or post-transformed image layers. In this context, the term "transformed" means that a sprite display processor has applied the sprite's 2D transform to the sprite to transform the sprite to output device coordinates (screen coordinates). Performing compositing operations on pre-transformed sprites can save the extra overhead associated with transforming the sprites in cases where the combined pixels are not going to be displayed immediately. In these cases, the compositor can combine pretransformed layers, and then write the results back to sprite memory. Later, to display the combined layers, the sprite display processor can retrieve the combined layers from sprite memory and instruct the compositor to combine them with any other layers to construct final output pixels for display.

An additional advantage to compositing pre-transformed sprites is that it enables the sprite display processor to transform the composited sprite samples that result from intermediate composite operations. It is important to keep in mind, however, that pre-transformed sprites should be in a common coordinate system, namely, have the same spatial resolution and orientation. An alternative way to support transforms on composited sprites is to implement a path from memory buffers or registers in the compositor back to the sprite display processor. This is similar to transferring the intermediate results of a compositing operation to sprite memory, except that the intermediate results are transferred directly to the sprite display processor rather than being temporarily stored back in sprite memory.

Sprite memory is a memory device for storing rendered image layers (sprites). For example, in the implementation described further below and in U.S. Pat. No. 5,867,166, the sprite memory is a shared RAM memory and the sprite display processor is implemented as a special purpose hardware device called the gsprite engine. These implementation details are described in more detail below. The sprite display processor is a device (either special hardware or programmed computer) that fetches sprites from sprite memory, transforms sprites from sprite space to output device coordinates, and controls the compositing of pre- or post-transformed sprites in the compositor.

The step of transforming sprite samples to screen coordinates can be implemented using any of a variety of conventional image mapping techniques. One approach is to perform a backward mapping of screen pixels to sprite space and filter neighboring sprite samples around this point in sprite space.

Once transformed to the screen the compositor can combine the resulting pixel values using image operators. To perform a wider range of shading operations on factored image layers, the compositor should support image operators in addition to the Over operator.

Generalized Compositor

A wider variety of shading operations can be performed in the compositor if it supports a number of image operators and has buffers for accumulating intermediate and final pixel values.

Figure 17:
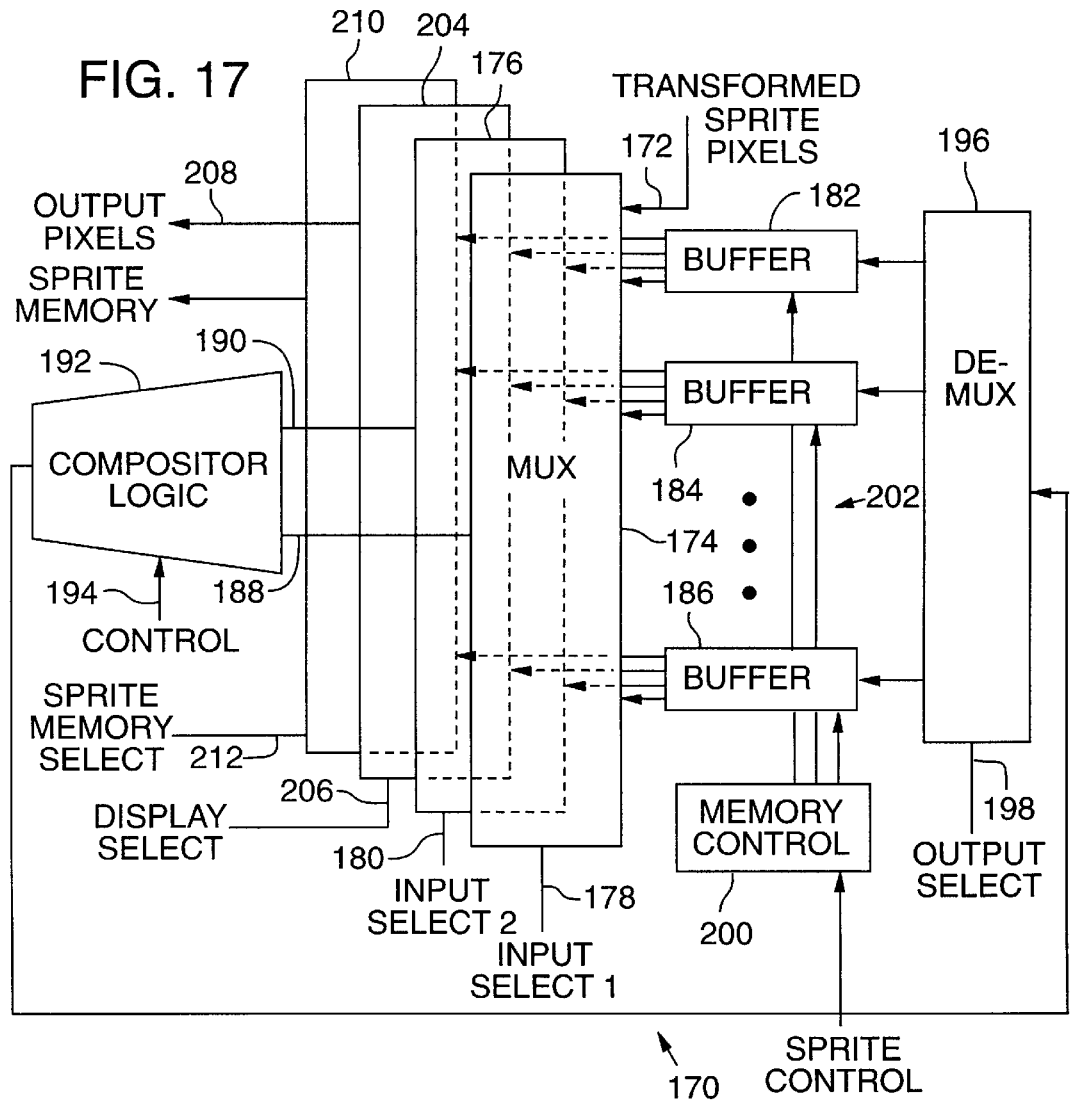
FIG. 17 is a block diagram of a compositor used to combine image layers into an output image.

FIG. 17 is a block diagram illustrating a generalized compositor 170. The compositor receives transformed sprite samples, combines them with intermediate pixel values at corresponding pixel locations from one of its buffers, and then stores the new intermediate or final pixel values in another one of its buffers. Intermediate pixel values refer to results of a compositing operation that will be combined with other pixels to compute final pixels of an output image. Final pixel values refer to pixels that are ready to be scanned out to a display device. As the compositor combines intermediate pixels in one buffer, it transfers final pixel values for display from another buffer.

The input sprite samples 172 enter the compositor 170 at one of two input multiplexers 174, 176. In response to input select signals 178, 180, the input multiplexers 174, 176 select input from a set of buffers 182–186 and the input sprite samples. The multiplexers transfer the selected outputs 188, 190 to the compositing logic 192.

The compositing logic 192 includes a set of image operators that combine pixel values at corresponding pixel locations from two image layers. The control signal 194 of the compositing logic selects the type of image operator. The compositor 170 should preferably support the Over, ADD, and multiplier operators.

Other image operators can also be implemented in the compositor. The following table is a list of image operators from Porter and Duff.

| operation | $F_A$ | $F_B$ |
| --- | --- | --- |
| clear | 0 | 0 |
| A | 1 | 0 |
| B | 0 | 1 |
| A over B | 1 | $1-\alpha_A$ |
| B over A | $1-\alpha_A$ | 1 |
| A in B | $\alpha_B$ | 0 |
| B in A | 0 | $\alpha_A$ |
| A out B | $1-\alpha_A$ | 0 |
| B out A | 0 | $1-\alpha_A$ |
| A atop B | $\alpha_B$ | $1-\alpha_A$ |
| B atop A | $1-\alpha_B$ | $\alpha_A$ |
| A xor B | $1-\alpha_B$ | $1-\alpha_A$ |
| A plus B | 1 | 1 |

$F_A$ and $F_B$ represent the fractions of the respective input images that are present in the final, composite image. As Porter and Duff describe, the color component of pixels in the composite image, $c_o$, can be expressed as: $c_A F_A + c_B F_B$, where $c_A$ and $c_B$ are the color components of image A and image B premultiplied by alpha of the pixel, $c_A = {}_A C_A$; $c_B = {}_B C_B$.

$C_A$ and $C_B$ are the true color components before premultiplication by alpha.

The Porter and Duff operators also include "unary" operators performed on a single image:

darken $(A, \phi) = (\phi r_A, \phi g_A, \phi b_A, {}_A)$
dissolve $(A, b) = (\delta r_A, \delta g_A, \delta b_A, \delta {}_A)$;
where normally, $0 \leq \phi$, $\delta \leq 1$. These image operators and those described previously are a representative, but not an exclusive listing of the types of image operators that can be implemented in the compositing logic.

The compositing logic 192 sends its output to a demultiplexer 196. The demultiplexer selects one of the buffers 182–186 that will receive the pixel values produced by the compositing logic. In response to an output select signal 198, the demultiplexer 196 selects one of the buffers and transfers the pixel values from the compositing logic 192 to the selected buffer.

The number of buffers used to implement the generalized compositor can vary. The compositor should include at least one buffer for holding final pixels in the output image, and two additional buffers for combining intermediate results. It is also possible to use separate buffers for alpha and color values. The buffers do not need to be large enough to store an entire output image. For example, they could be designed to hold a scanline or a scanline band.

The compositor has memory control logic 200 to control the transfer of pixels into and from the buffers. By sending control signals 202 to the buffers, the memory control logic controls the rate at which pixel values are scanned from the buffers and ensures that the inputs to the compositing operation are synchronized.

To send output pixels to the display, the compositor has an output multiplexer 204 that selects one of the buffers in response to an output select signal 206. The memory control 200 controls the transfer of pixels 208 from the selected buffer to the output multiplexer 204.

To send output pixels back to sprite memory, the compositor has a sprite memory mulitplexer 210 that selects one of the buffers in response to sprite memory select signal 212. This path back to sprite memory allows the compositor to combine pre-transformed image layers. Note that the sprite memory multiplexer 210 does not need to be implemented using a separate multiplexer. For example, it can be implemented as part of the output multiplexer, or one or more of the buffers can be interfaced with sprite memory to allow the results of compositing operations to be written directly from a buffer to sprite memory.

The generalized compositor operates under the control of a sprite display processor. One example of the sprite display processor, called the gsprite engine, is described further below and in co-pending application Ser. No. 08/671,412. The sprite display processor sends the input select signals, the output select signal, the display select signal and the memory control signals to the compositor 170. The sprite display processor also selects the image operator by sending the control signal to the compositing logic.

Using the Over Operator for Shading Operations

While the generalized compositor supports a wider variety of shading operations on images, a compositor that only supports the standard Over operator can still perform many common shading operations. The Over operator can act as an ADD operator as explained above and can approximate a Multiply operator.

To illustrate how to approximate the Multiply operator with the Over operator, consider the case where the Multiply operator is used to multiply a sprite representing the receiver by another sprite representing the shadow attenuation coefficients. Let B=[b B, b] be the receiver, where B is the color and b is the coverage. Let A=[a A, a] be the desired shadow sprite, where A is the color and a is the coverage. Further, let s be the shadow attenuation coefficients obtained by scan-converting the geometry of the background while looking up values in the shadow map of the fast moving object, where 0 means fully in shadow and 1 means fully illuminated.

The desired result is C=[sbB, b]. The renderer prepares the shadow sprite by setting A=0 and a=(1−s) b. Then, using the Over operator, the compositing buffer computes C'=A over B=[(1−(1−s)b)bB, (1−s)b+(1−(1−s)b) b]=[sbB+(1−s) (1−b)bB, b+(1−s)(1−b)b], which is close to the correct answer.

Where there is no shadow, s is 1, and the compositing buffer produces the correct answer of [bB, b]. Where coverage is complete, b is 1 and we get the correct answer of [sB, 1]. The problem lies in regions of shadow that are also regions of partial coverage.

The absolute error can be computed by subtracting the approximate value from the desired value, to get C'−C= [sbB+(1−s)(1−b)bB, b+(1−s)(1−b)b]−[sbB, b]=[1−s)(1−b) bB, (1−s)(1−b)b]. The most error occurs when the color B is 1, in which case the error for both the color and the alpha is the same, (1−s)(1−b)b. The maximum absolute error is 0.25 and occurs when b=0.5 and s=0, when the pixel is half transparent and fully shadowed.

Using the Layered Pipeline to Re-Use Shadow Layers

The layered pipeline can factor terms in the lighting and shading model and render these terms at different update rates. Shadow layers constitute a subset of the terms in a shading model that can be rendered to separate layers. Within this subset, it is possible to re-use a shadow map and an array of shadow attenuation coefficients (shadow image). A description of how to re-use the shadow map and shadow image appears in co-pending U.S. patent application Ser. No. 08/671,660 now issued as U.S. Pat. No. 5,870,097, filed Jun. 27, 1996, by John M. Snyder, James T. Kajiya, Steven A. Gabriel, and Michael A. Toelle, entitled Method and System for Improving Shadowing in a Graphics Rendering System, which is hereby incorporated by reference.

Re-using a shadow map for subsequent frames reduces the overhead associated with computing shadows. However, image quality will decline if the shadow map is not sufficiently accurate for subsequent frames. One way to improve the accuracy of the shadow map is to clamp the bias as explained in co-pending application Ser. No. 08/671,660. Another important aspect of maintaining an accurate shadow map is evaluating whether the shadow map should be re-generated before computing subsequent frames of animation.

One way to test the accuracy of the shadow map is to evaluate how the position of a shadowing object changes from frame to frame. If the position changes more than a predefined amount, then the rendering system should re-compute the shadow depth map. More specifically, a graphics preprocessor in the rendering pipeline evaluates the change in position of the shadowing object by evaluating the change in position of characteristic points in the object model from frame to frame. This test is similar to the test used to determine whether an animated object can be accurately simulated by performing an affine transform on a of a previous rendering. The geometric fiducial used to evaluate the accuracy of a warped gsprite can also be used to determine whether the position of a shadowing object has changed to such an extent that the shadow map should be regenerated.

To evaluate the accuracy of a shadow map for re-use, the preprocessor transforms characteristic points on a shadowing object into shadow map space for a first frame of animation, and storing the location of these characteristic points. The preprocessor can then test the accuracy of the shadow map for subsequent frames by comparing these transformed characteristic points with characteristic points transformed to shadow map space for a subsequent frame. If the difference in position of the transformed characteristic points exceeds a predefined amount (such as a user defined threshold value for example), then the preprocessor can instruct the renderer to compute the shadow map.

In this context, shadow map space refers to a three dimensional space with the view point located at the light source. The rendering system computes the position of a characteristic point in shadow map space by projecting the point using a orthographic projection, if the light source is infinitely distant, or a perspective projection, if the light source is in the scene or close to it. The system, namely the preprocessor, uses the geometric fiducial to evaluate the difference between the transformed characteristic points between the first and a subsequent frame.

As a further optimization, the rendering system can also re-use a shadow image for subsequent frames. A shadow image comprises an array of shadow attenuation coefficients computed in the shadow filtering pass while rendering a shadowed object to a 2D image. In subsequent frames, the renderer can re-apply the shadow image to an image illuminated by a light source if the shadow image still remains valid. To be valid, the position of the shadowing object and the shadowed object from the perspective of the light source need to be within a pre-defined tolerance. Specifically, the position of characteristic points of the shadowing object in shadow map space should be within a predefined tolerance, and the position of characteristic points of the shadowed object should also be within a predefined tolerance. In addition, the renderer must understand how the shadow image lays on the shadowed object. For undulating objects and in scenes where the shadowed and shadowing objects are moving, it is generally not practical to re-use a shadow image. For a fairly flat object, e.g., desert or calm ocean, reuse of the shadow image is more practical because the manner in which the shadow falls on a flat object is more consistent. If the characteristic points of the shadowed object are not changing at all, the shadow could still have moved in relation to it, making the shadow image unusable. The shadow image can be affinely warped to account for the motion of the shadowing object. The extent to which the shadow image can be re-used can be measured by the change in position of the shadowing object and the error introduced by the affine approximation.

The preprocessor determines when a shadow image can be re-used by determining how characteristic points on the shadowing and shadowed objects change between a first frame in which the shadow image is originally rendered, and a subsequent frame where the shadow image may be re-applied. Specifically, the preprocessor transforms characteristic points on the shadowing object to shadow map space for a first frame, and stores this data for subsequent frames. It then transforms the characteristic points for a subsequent frame, and compares the position of the transformed characteristic points from the first and the current frame. The preprocessor does the same for characteristic points on the shadowed object, preferably for characteristic points in proximity to where the shadowing object casts its shadow. If the difference between the transformed points is greater than a predefined tolerance, the shadow image should not be re-used, and should be re-rendered.

If the shadow image is to be re-used, it can be applied to a rendered image layer using a multiply operator in the compositor. The multiply operator can be specifically supported in the compositing logic or approximated using the Over operator.

Regulation

An important advantage of the layered pipeline is that it can allocate rendering resources to separate image layers. In addition to the traditional quality parameters such as geometric level-of-detail or the quality of the shading model (e.g., flat, Gouraud, or Phong-shaded), the quality parameters in the layered pipeline include the temporal and spatial resolution of separate image layers. To achieve optimal quality with fixed rendering resources, the layered pipeline uses a regulator to adjust the quality parameters. The regulator is the part of the graphics preprocessor that dynamically measures the costs and benefits of changing the quality parameters and allocates rendering resources accordingly.

In this context, the costs refer to the change in render resources consumed as a result of a change in the quality parameter. For example, if the regulator increases the update rate, the cost increases because the renderer will need to scan convert more geometric primitives (e.g., polygons) per frame on average. If the regulator increases the resolution of an image layer, the cost increases because the renderer will need to rasterize more pixels per polygon.

The benefits refer to the change in perceptual fidelity reflected in the fiducials. For example, if a warped layer's fiducials turn out to fall within threshold values on the fiducials, the warped layer is a good approximation of a re-rendered layer. As an alternative, the regulator can be programmed to assign a rendering priority to warped layers based on the extent of their distortion, measured by the amount that the fiducals surpass corresponding thresholds.

Figure 18:
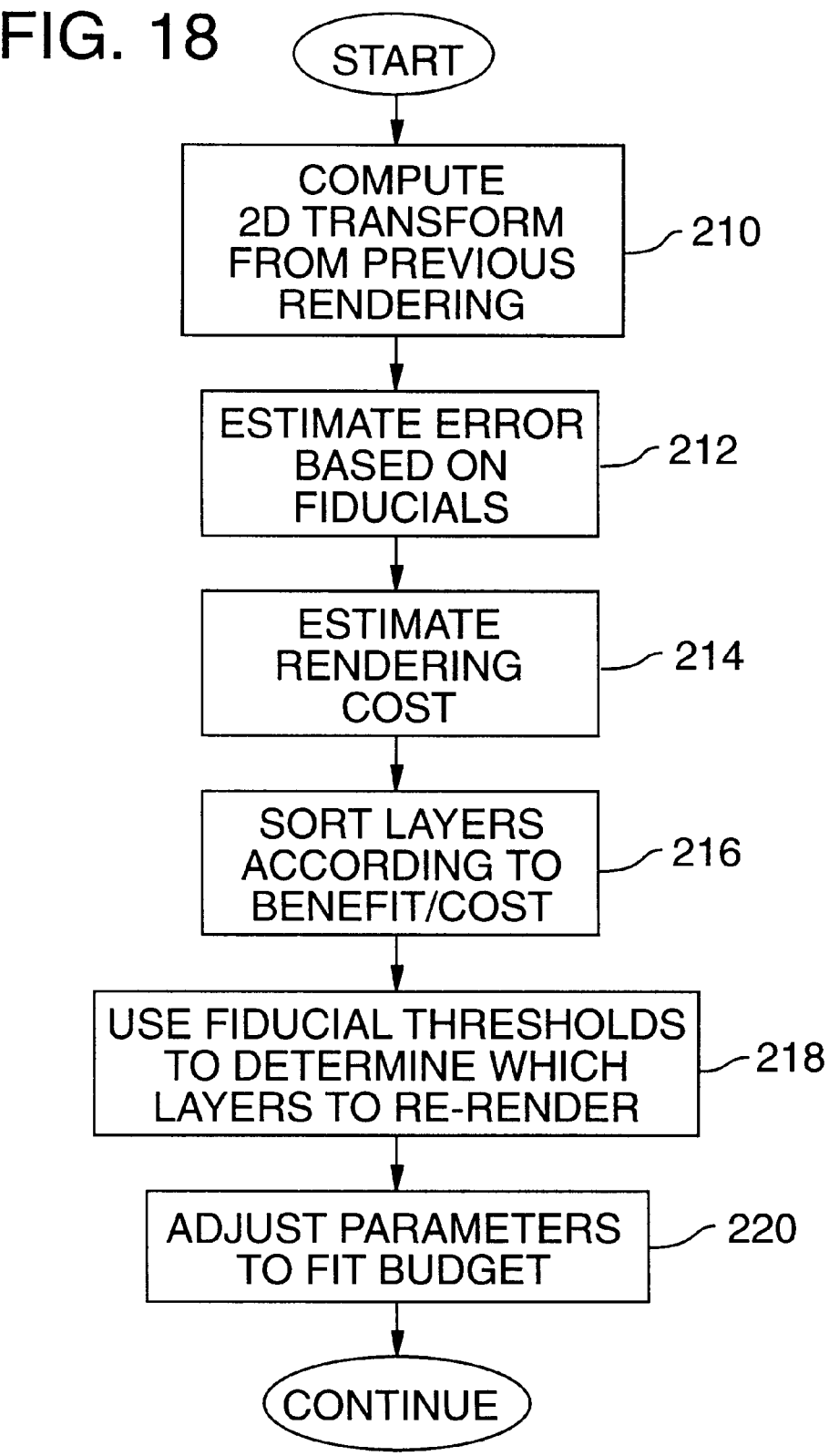
FIG. 18 is a flow diagram illustrating a method for regulating update rate and spatial resolution of image layers in a layered graphics rendering pipeline.

Our implementation of the regulator uses a simple cost-benefit scheduler and fiducial thresholds. The fiducial threshold provides a cutoff below which no attempt to re-render the layer is made (i.e., the image warp approximation is used). FIG. 18 is a flow diagram illustrating how this implementation of the regulator allocates rendering resources for each frame. The regulator is implemented in the preprocessor of a layered graphics rendering pipeline.

The first step 210 is to compute the sprite transforms for each of the independent scene elements in the layered pipeline. For scene elements rendered in a previous frame;, the preprocessor computes a warp based on the previous rendering using the characteristic points of the previous and current frame.

In the next step 212, the preprocessor computes fiducials to estimate the distortion of the warped sprite. In this step, the preprocessor can use any combination of the four fiducial types described above.

Next, the preprocessor estimates the rendering cost of each layer as shown in step 214. Our implementation of the regulator bases this cost estimate on a polygon budget, and measures the fraction of this budget consumed by the number of polygons in the object geometry of each layer.

In step 216, the preprocessor sorts layers according to the benefit and cost. Next, it uses the fiducial thresholds to determine which layers to re-render as shown in step 218. The preprocessor selects the layers that do not satisfy thresholds on the fiducials. It then adjusts the quality parameters of the selected layers to fit within a budget as depicted in step 220. Specifically, the regulator adjusts the sprite's spatial resolution to fit within a budgeted total sprite size. This accounts for the rate at which the renderer can rasterize pixels. Our implementation uses a global average depth-complexity estimate to reduce the budget to account for rasterization of hidden geometry. The depth complexity of factored geometry is much less than a frame buffer rendering of the entire scene. Sprites that have been selected for re-rendering in step 218 are allocated part of this total budget in proportion to their desired area divided by the total desired area of the selected set. To dampen fluctuations in the regulation parameters which are perceptible when large, parameter changes are clamped to be no more than ±10% of their previous value at the time of last re-rendering.

At this point, the renderer renders the selected layers in order, stopping when all resources are used. Our regulator can be used as a "budget-filling" regulator or a "threshold" regulator. For a budget-filling regulator, the fiducial threshold is set to be small, on the order of a $\frac{1}{1000}$ of the typical maximum error. All of the rendering resources are used in the attempt to make the scene as good as possible. For a threshold regulator, the threshold is raised to the maximum error that the user is willing to tolerate. This allows rendering resources to be used for other tasks.

Layered Pipeline Implementation

One implementation of a layered graphics rendering pipeline is described in U.S. Pat. No. 5,867,166. For convenience, we describe the details of the architecture here.

Figure 19:
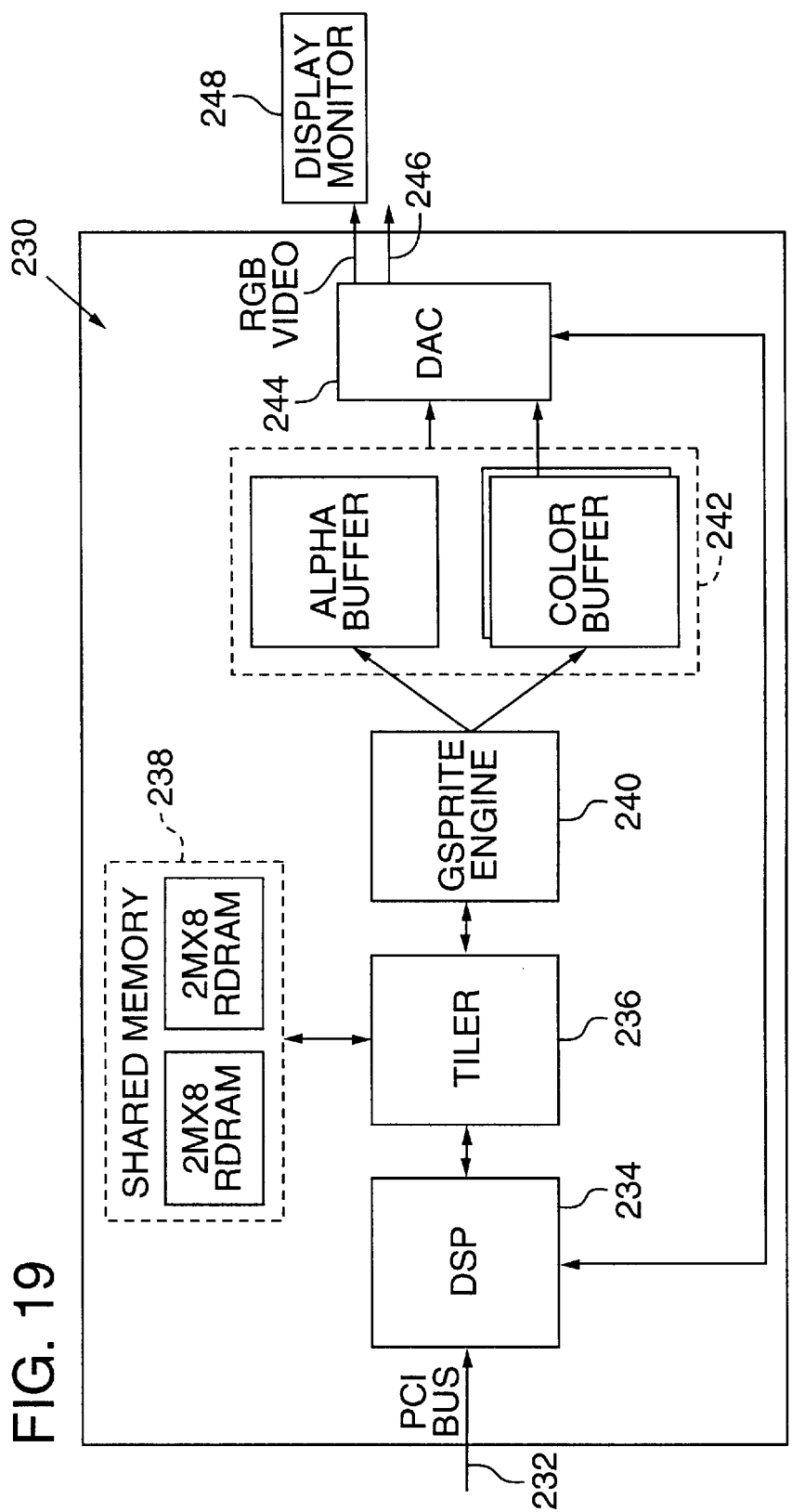
FIG. 19 is a block diagram of a rendering system that supports a layered graphics rendering pipeline.

FIG. 19 is a block diagram illustrating an implementation of a layered graphics rendering system 230. This implementation is designed to communicate with a host computer (a PC) through a bus 232. The tasks of the preprocessor described above are shared between a microprocessor on the host PC and a DSP 234. It is also possible to implement the functions of the preprocessor entirely in a single processor, such as the microprocessor of a host PC.

The rendering system includes the DSP 234, tiler 236, shared memory 238, the gsprite engine 240, compositing buffer 242, and a digital-to-analog converter (DAC) 244. The bus 232 transfers commands and data between the host and the DSP 234. In response to rendering commands from the host, the rendering system renders independent scene elements to sprites, combines the sprites into display images, and transfers the display images to a display device through the DAC 244.

The shared memory 238 stores image processing commands and sprites in a specific sprite format called a gsprite (generalized sprite). In this implementation, the shared memory is used to store gsprite and texture data in compressed form, DSP code and data, and various buffers used to transfer data between processing subsystems. The shared memory 216 shown here comprises 4 Mbytes of RAM, and is implemented using two 8-bit Ram bus channels.

The DSP 234 is responsible for performing front end geometry processing, and sprite management. Specifically, the DSP performs front end geometry and lighting calculations used for 3-D graphics. This includes model and viewing transformations, clipping, and lighting. The DSP also performs sprite management including 1) computing sprite transforms, 2) sorting geometry assigned to a sprite among 32×32 sample chunks; 3) tracking sprite motion through their characteristic points; 4) computing warps to approximate changes in position and lighting of previous renderings; 5) computing fiducials; 6) and regulating rendering resources by dynamically adjusting quality parameters of image layers. In sum, the DSP functions as the preprocessor in the layered pipeline. It is important to note that the functions of the preprocessor can also be implemented on the host processor, instead of using both the host processor and DSP.

The architecture of the rendering system shown in FIG. 19 is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance. The host processor can used in place of the DSP and interface directly with the tiler 236 through the bus 232.

The rendering system 230 shown in FIG. 19 manages image data in three different units: gsprites, chunks, and blocks. The system serially renders image layers in 32×32 sample chunks. To prepare an object for rendering to a sprite, the DSP divides a sprite into chunks and sorts geometry assigned to the sprite among the chunks. The DSP also computes a gsprite display list that lists the gsprites for an output image. This display list includes pointers to gsprites, and more specifically, to gsprite data structures called header blocks. The gsprite header lock stores a number of attributes of a gsprite including gsprite width, height, and an affine transform defined in terms of a screen space parallelogram (it may be preferable to use a rectangle to reduce anisotropy of sprite samples). The gsprite header block also includes a list of its member chunks. This list is in the form of pointers to chunk control blocks.

The DSP 234 sets up the gsprite header blocks and stores them in shared memory 238. The gsprite header block includes a header for storing various attributes of the gsprite and for keeping track of where related image data is stored in the shared memory. The data structure includes fields to store the size of the gsprite, to represent the edge equations for the screen edges of the gsprite, to maintain 2-D transform data, and other image attributes.

Chunk control blocks include per chunk and per block parameters. The per chunk parameters include compression parameters, pixel format, and whether the pixel data resides in memory managed in Memory Allocation Units (MAU) in linear memory. An MAU is a piece of shared memory used to allocate chunk memory. MAU managed memory includes a list of MAUs (124 bytes for example), each MAU having a pointer to the next MAU. In one specific implementation for example, the chunk control blocks are stored in sequential MAUs for each gsprite.

The per block parameters include compression type, number of MAUs the block spans, and a block pointer pointing to the first byte of pixel data for the block. The specific block format is an 8×8×4 array of pixels that encode 32 bit pixels (8 bits for RGB and Alpha).

The tiler 236 performs scan-conversion, shading, texturing, hidden-surface removal, anti-aliasing, translucency, shadowing, and blending for multi-pass rendering. Preferably the tiler is implemented as a VLSI chip along with the gsprite engine 240. The tiler rasterizes polygons one chunk at a time in a serial fashion. It has double buffered rasterization buffer so that it can compute sprite samples in one buffer, while resolving fragments for samples in the second buffer. The tiler compresses and stores the resulting rendered gsprite chunks in the shared memory. The gsprite engine 240 operates at video rates to address and decompress the gsprite chunk data and perform the necessary image processing for general affine transformations (which include scaling, translation with subpixel accuracy, rotation, reflection and shearing). The gsprite engine can be implemented on the same or a different chip from the tiler 236. If on a separate chip, it interfaces with a memory interface unit in the tiler to access the gsprite data structures in shared memory.

The gsprite engine 240 includes a video timing generator which controls video display refresh, and generates the timing signals necessary to control gsprite accesses. To display each frame, the gsprite engine 240 traverses the gsprite display data structures to determine which gsprites need to be read for any given 32-scanline band. For each gsprite in a band, the gsprite engine reads the header block, clips the gsprite to the current display band, and places the gsprite in the gsprite queue for rasterization. The gsprite engine scans each gsprite based on the specified affine transform in the gsprite header and generates read requests. To hide the latency of gsprite accesses, the gsprite engine utilizes a caching scheme that pre-fetches and caches gsprite blocks in a cache memory before a rasterizer computes transformed sprite samples using the cached data.

A simple rasterizer in the gsprite engine scans each gsprite based on the specified affine transform in the gsprite header and calculates the filter parameters for each pixel. The gsprite engine uses a filter to map color and alpha data at sample locations in gsprite space to screen space. Specifically, it applies either a 2×2 or 4×4 filter kernel to compute pixel values (color or both color and alpha) at pixel locations in screen space.

The gsprite engine has a compositing buffer control for controlling the operation of a compositing buffer. The compositing buffer control passes transformed sprite samples and instructions on how to combine samples from different layers. The compositing buffer control monitors a ready line from the compositing buffer 242 to ensure that the gsprite engine 240 does not overrun the compositing buffer 242.

Gsprite chunk data is processed a number of scan lines at a time for display. In one implementation, chunk data is processed 32 scan lines at a time. This implementation of the compositing buffer 242 includes two 32 scan line color buffers which are toggled between display and compositing activities. The compositing buffer also includes a 32 scan line alpha buffer which is used to accumulate alpha for each pixel. This particular compositing buffer has compositing logic that implements the standard Over image operator. The compositing logic receives transformed sprite samples, and combines them with the accumulated color values using the alpha values from the alpha buffers. As an alternative, the compositing buffer can be implemented as shown in FIG. 18 and described above.

The DAC 244 includes a RGB video DAC and corresponding video port 246, to video editing devices. Individual components can be used to implement the functionality of the DAC. The DAC 244 implements the basic functions that are common to most RAMDACs on the market today. The DAC includes logic for reading and writing internal control registers, and for pipelining the video control signals. The DAC includes pixel data routing logic that controls the routing of pixel data from the compositing buffers to the display monitor 248. In the normal operating mode, this data is passed at pixel rates to Color LUTs for each of the three channels. The DAC also has a clock generator that generates the video clock. These clocks are generated by two phase locked clock generators to eliminate synchronization drift.

Though we described a specific implementation of the layered pipeline, it is important to emphasize that our method for rendering factored terms of a shading model can apply to other architectures as well. As noted above, the functions of the layered pipeline can be emulated in software instructions. These software instructions can be stored on any of a variety of conventional computer readable media and executed on commercially available processors including the microprocessor of a PC or workstation, or on a DSP such as shown in FIG. 19.

Portions of the layered rendering pipeline can be implemented in either software or hardware. In the description above, the functions of the preprocessor are designed to be implemented in a processor such as the DSP or the microprocessor of computer system. The tiler represents a specific example of a renderer in a layered pipeline, but other more conventional hardware or software renderers can be used instead to render object geometry to image layers. The gsprite engine and compositing buffer form one implementation of a compositor in a layered pipeline, and other implementations are possible as well. For example, the compositor can be emulated in software, or can be emulated in other graphics rendering systems that support texture mapping.

In view of the many possible embodiments to which the principles of our invention may be applied, it should be recognized that the implementations described above are only examples of the invention and should not be taken as a limitation on the scope of the invention. Rather, the scope of the invention is defined by the following claims. We therefore claim as our invention all that comes within the scope and spirit of these claims.

We claim:

1. A method for performing shading operations in a graphics rendering system, the method comprising:

factoring terms in a shading model into separate image layers, where the shading model represents a description of shading to be applied to 3D scene geometry and the shading model is factored over a 3D object or set of 3D objects in the 3D scene geometry;

separately rendering the 3D scene geometry to the separate image layers, where two or more of the layers have different rendering update rates; and combining the terms of the shading model by compositing the separate image layers using an image operator to combine the rendered image layers into an output image.

2. The method of claim 1 wherein two or more of the layers are rendered at different spatial resolution.

3. The method of claim 1 further including computing a 2D image warp from changes in position of characteristic points of a 3D object in the 3D scene between a previous frame and a subsequent frame and warping a rendered image layer from the previous frame to approximate change in the image layer from the previous frame to the subsequent frame.

4. The method of claim 1 wherein the method further includes computing a sprite transform for each image layer by projecting 3D object geometry into screen coordinates, finding a bounding region for the projection of the 3D object in the screen coordinates, and deriving the sprite transform from the bounding region;

storing the sprite transforms for each of the corresponding image layers, where each sprite transform defines a mapping of an image layer from sprite coordinates to the screen coordinates, and 3D geometry corresponding to the image layer is rendered into a 2D space defined by the sprite coordinates to create the image layer.

5. The method of claim 4 including updating the sprite transforms of two or more of the image layers at different rates than the corresponding image layers are updated.

6. The method of claim 4 wherein the sprite transform of at least one of the image layers is used to transform an associated image layer rendered to a first spatial resolution to a second, different spatial resolution than the first spatial resolution.

7. The method of claim 1 wherein the image operator includes an over image operator.

8. The method of claim 1 wherein the image operator includes an add image operator for adding first and second image layers together.

9. The method of claim 1 wherein the image operator includes a multiply image operator for multiplying a first image layer by an array of coefficients.

10. The method of claim 1 wherein the step of combining image layers includes using two or more image operators.

11. The method of claim 10 wherein the two or more image operators include an over image operator and an add image operator.

12. The method of claim 11 wherein the two more image operators further include the multiply image operator.

13. The method of claim 1 wherein the shading model is factored into first and second lighting terms, and one of the image layers corresponding to the first lighting term represents a rendering of a 3D object illuminated by a first light source and another one of the image layers corresponding to the second lighting term represents a rendering of the 3D object illuminated by a second light source; and further including:

rendering the 3D object illuminated by the first light source to a first image layer;

rendering the 3D object illuminated by the second light source to a second image layer; and compositing the first and second image layers into the output image.

14. The method of claim 1 wherein the shading model is factored into first and second texture layers, and one of the image layers corresponding to the first texture layer represents a first texture mapped to 3D object geometry in the scene and another image layer corresponding to the second texture layer represents a second texture mapped to the 3D object geometry; and further including:

rendering the 3D object geometry, including texture mapping a first texture image to the 3D object geometry, to compute a first image layer;

rendering the 3D object geometry, including texture mapping a second texture image to the 3D object geometry, to compute a second image layer; and compositing the first and second image layers into the output image.

15. The method of claim 1 wherein one of the image layers represents a shadow layer in the 3D scene, where the scene has a viewpoint and a light source, and rendering the shadow layer includes:

rendering the 3D scene from the perspective of the light source to generate a depth map; and rendering the 3D scene from the perspective of the view point to determine shadow attenuation coefficients using the depth map;

wherein the shadow layer is re-rendered at a different rate than a rendered image layer of 3D object geometry to which the shadow layer is applied.

16. The method of claim 1 wherein one of the image layers represents a reflection layer, and further including rendering a 3D object in the scene into the reflection layer and re-rendering the 3D object to the reflection layer at a different rate than other layers.

17. A method for performing shading operations in a graphics rendering system, the method comprising:

factoring terms in a shading model into separate image layers, where the shading model represents a description of shading to be applied to 3D scene geometry and the shading model is factored over a 3D object or set of 3D objects in a 3D scene;

separately rendering the 3D scene geometry to the separate image layers, where two or more of the layers are rendered at different spatial resolutions; and combining the terms of the shading model by compositing the separate image layers using image operators.

18. The method of claim 17 further including warping a rendered image layer of a 3D object from a previous frame to approximate change in lighting or geometric position of the object represented in the image layer from the previous frame to a subsequent frame.

19. The method of claim 18 wherein the warping step comprises computing a color warp by sampling a lighting model at characteristic points of a 3D object in the previous frame and the subsequent frame to compute lighting changes, and finding a color warp that approximates the lighting changes at the characteristic points; and performing the color warp on the rendered image layer from the previous frame to approximate the change in color values from the previous to the subsequent frame.

20. The method of claim 18 further including computing a 2D image warp from changes in position of characteristic points of a 3D object in the 3D scene between the previous frame to the subsequent frame;

wherein the warping step comprises performing the 2D image warp to transform the rendered image layer from a first screen position for the previous frame to a second screen position in the subsequent frame.

21. The method of claim 17 wherein the method further includes storing a sprite transform with each of the image layers, where the sprite transform defines a mapping of an image layer from sprite coordinates to screen coordinates, and 3D geometry corresponding to the image layer is rendered into a 2D space defined by the sprite coordinates to create the image layer.

22. The method of claim 21 including updating the sprite transforms of two or more of the image layers at different rates than the corresponding image layers are updated.

23. A computer-readable medium having computer executable instructions for performing the steps of claim 17.

24. A computer-readable medium having computer executable instructions for performing the steps of claim 1.

25. A sprite compositor for performing shading operations in a graphics rendering system comprising:

a set of buffers for storing pixel values from factored image layers, where the image layers correspond to terms in a shading model, where the shading model represents a description of shading to be applied to 3D scene geometry, the shading model is factored over a 3D object or set of 3D objects in a 3D scene, and the 3D object or set of 3D objects are independently and separately rendered to each of the image layers such that a different term in the shading model applies for each independent rendering to the layers;

an input multiplexer for selecting input pixels from among the set of buffers;

compositing logic including at least one image operator for combining input pixels from separate image layers;

a demultiplexer coupled to the compositing logic for receiving combined input pixels and selecting one of the set of buffers to store the combined input pixels; and an output multiplexer for selecting one of the set of buffers to transfer display pixels from the sprite compositor.

26. The sprite compositor of claim 25 wherein the compositing logic includes two or more image operators for combining input pixels from separate image layers into output pixels of an output image.

27. The sprite compositor of claim 26 wherein the compositing logic includes a multiply image operator for multiplying input pixels by modulation factors from a separate image layer.

28. A method for performing shading operations in a graphics rendering system, the method comprising:

separately rendering 3D scene geometry to separate image layers, where the separate image layers represent factored terms of a shading model, two or more of the layers have different rendering update rates, the shading model represents a description of shading to be applied to 3D scene geometry and terms of the shading model are factored over a 3D object or set of 3D objects in a 3D scene such that each factored term is applied separately to the 3D object or set of 3D objects while the object or objects are rendered to respective image layers; and combining the terms of the shading model by compositing the separate image layers using an image operator to combine the rendered image layers into an output image.

29. The method of claim 28 wherein at least one of the layers is rendered at a different spatial resolution than the output image and then scaled to the spatial resolution of the output image for display.

30. A method for performing shading operations in an authoring tool, the method comprising:

factoring 3D scene geometry into separate layers such that subsets of the 3D scene geometry are allocated to each of the layers;

allocating 3D rendering resources of the authoring tool to a layer or a subset of the layers currently being edited by a user according to the following steps:

rendering the subset of the 3D scene geometry allocated to the layer or subset of the layers that are currently being edited by the user; and combining the layer or subset of the layers currently being edited with pre-rendered layers to create output images in a sequence of animation.

31. The method of claim 30 further including:

factoring a shading model of a 3D object in the scene geometry into separate layers, where one or more of the separate layers of the factored shading model have a blending factor;

in response to the user editing the blend factor of an edited layer, rendering the edited layer of the 3D object associated with the blend factor and combining the edited layer with the pre-rendered layers such that the 3D rendering resources are allocated to the edited layer.

* * * * *

UNITED STATES PATENT AND TRADEMARK OFFICE
CERTIFICATE OF CORRECTION

PATENT NO.     : 6,016,150
DATED          : January 18, 2000
INVENTOR(S)    : Lengyel et al.

It is certified that error appears in the above-identified patent and that said Letters Patent is hereby corrected as shown below:

On Title Page,
Column 2,
Line 20, for the second Regan reference, "pp. 1-1" should read --pp. 1-13--.

Column 10,
Line 11, "flew" should read --flow--.

Column 12,
line 36, "thu" should read --the--

Column 15,
Line 40, "SIGGiRAPH" should read --siggraph--.

Column 17,
Line 48, "$\hat{p}\hat{p}$" sould read --$\hat{p}\hat{p}^T$--.

Column 18,
Line 62, "me asurements" should read --measurements--.

Column 21,
Line 55, "bacl-facing After" should read --back-facing. After--.

Column 22,
Line 5, "umber" should read --number--.

Column 23,
lines 62-63, "$c_A=_AC_A; c_B=_BC_B.$" should read --$c_A=\alpha_A C_A; c_B=\alpha_B C_B$.--.

Column 24,
Line 2, "$\delta^A$ should read --$\delta\alpha_A$--.

Column 25,
Line 58, "of a previous rendering" should read --previous rendering--.

UNITED STATES PATENT AND TRADEMARK OFFICE
CERTIFICATE OF CORRECTION

PATENT NO. : 6,016,150
DATED : January 18, 2000
INVENTOR(S) : Lengyel et al.

It is certified that error appears in the above-identified patent and that said Letters Patent is hereby corrected as shown below:

Column 27,
Line 40, "previous frame;," should read --previous frame,--.

Column 29,
Line 2, "can be used" should read --can be used--.
Line 13, "lock" should read --block--.

Column 32,
Line 6, "two more" should read --two or more--.

Signed and Sealed this

Twenty-sixthth Day of June, 2001

Attest:

Attesting Officer

NICHOLAS P. GODICI
Acting Director of the United States Patent and Trademark Office